US012774968B2

(12) United States Patent
Hadar et al.

(10) Patent No.: US 12,774,968 B2
(45) Date of Patent: Oct. 27, 2026

(54) NONDESTRUCTIVE ESTIMATION OF STRUCTURAL PROPERTIES OF A SPECIMEN VIA X-RAY MODELLING BASED ON SIMULATIONS AND GROUND TRUTH MEASUREMENTS

(71) Applicant: Applied Materials Israel Ltd., Rehovot (IL)

(72) Inventors: Uri Hadar, Tel-Aviv (IL); Doron Girmonsky, Raanana (IL); Dror Shemesh, Hod Hasharon (IL); Michal Eilon, Beit-Elazari (IL)

(73) Assignee: Applied Materials Israel Ltd., Rehovot (IL)

( * ) Notice: Subject to any disclaimer, the term of this patent is extended or adjusted under 35 U.S.C. 154(b) by 354 days.

(21) Appl. No.: 18/402,619

(22) Filed: Jan. 2, 2024

(65) Prior Publication Data

US 2025/0216347 A1 Jul. 3, 2025

(51) Int. Cl.
*G01N 23/2252* (2018.01)
*G01N 23/083* (2018.01)
*G01N 23/223* (2006.01)

(52) U.S. Cl.
CPC ....... *G01N 23/2252* (2013.01); *G01N 23/083* (2013.01); *G01N 23/223* (2013.01)

(58) Field of Classification Search
CPC .. H01J 37/00; H01J 37/02; H01J 37/26; H01J 37/28; H01J 37/20; G01N 23/083;
(Continued)

(56) References Cited

U.S. PATENT DOCUMENTS 4,634,868 A 1/1987 Delacy
5,412,210 A 5/1995 Todokoro et al.
(Continued)

FOREIGN PATENT DOCUMENTS

EP 2557587 B1 10/2015
EP 3297018 B1 3/2019

OTHER PUBLICATIONS

U.S. Appl. No. 17/901,705, "Final Office Action", May 27, 2025, 21 pages.
(Continued)

*Primary Examiner* — Jason L Mccormack
(74) *Attorney, Agent, or Firm* — Kilpatrick Townsend & Stockton LLP

(57) ABSTRACT

A system for non-destructive characterization of specimens that includes an electron beam (e-beam) source for projecting e-beams at one or more e-beam landing energies on a specimen; an X-ray detector for sensing X-rays emitted from the specimen, thereby obtaining measurement data; and processing circuitry configured to: (i) extract from the measurement data key features specified by a vector $\vec{f}_{key}$; and (ii) estimate values $\vec{p}$ of one or more structural parameters, characterizing the specimen, based on $\vec{f}_{key}$ and a set of vectors of ground truth (GT) and simulated key features $$\{\vec{f}_n\}_{n=1}^{N}.$$

Each of the $\vec{f}_n$ is a product of GT measurements or of computer simulations of emission of X-rays from a respective GT or simulated specimen due to impinging thereof with e-beams at each of the one or more landing energies.

20 Claims, 7 Drawing Sheets

(58) Field of Classification Search
CPC ............. G01N 23/223; G01N 23/2252; G01N 2223/079; G01N 2223/108; G01N 2223/304; G01N 2223/305; G01N 2223/316; G01N 2223/345; G01N 2223/414; G01N 2223/6116; G01N 2223/615; G01N 2223/633; G06F 17/10; G06F 30/20
USPC ................................. 250/306, 307, 310, 311
See application file for complete search history.

(56) References Cited

U.S. PATENT DOCUMENTS

| | | | | |
|---|---|---|---|---|
| 6,670,610 | B2 | 12/2003 | Shemesh et al. | |
| 8,232,523 | B2 | 7/2012 | Boughorbel et al. | |
| 8,581,189 | B2 | 11/2013 | Boughorbel et al. | |
| 8,709,269 | B2 | 4/2014 | Shemesh | |
| 9,625,398 | B1 * | 4/2017 | Campbell .......... | G01N 23/2252 |
| 10,354,418 | B2 | 7/2019 | Recur et al. | |
| 10,928,336 | B1 | 2/2021 | Shemesh | |
| 11,264,202 | B2 | 3/2022 | Chirko et al. | |
| 11,321,835 | B2 | 5/2022 | Levant et al. | |
| 11,404,244 | B1 | 8/2022 | Zur | |
| 11,543,368 | B2 | 1/2023 | Shemesh | |
| 2010/0196296 | A1 | 8/2010 | Geissler et al. | |
| 2012/0180859 | A1 | 7/2012 | Lee et al. | |
| 2013/0228683 | A1 | 9/2013 | Boughorbel et al. | |
| 2016/0322194 | A1 * | 11/2016 | Kooijman ............. | H01J 37/265 |
| 2016/0322195 | A1 | 11/2016 | Sender et al. | |
| 2020/0194224 | A1 | 6/2020 | Stoschus et al. | |
| 2020/0411513 | A1 | 12/2020 | Jambunathan et al. | |
| 2021/0356413 | A1 | 11/2021 | Sakamae | |
| 2023/0003675 | A1 | 1/2023 | Kaplenko et al. | |
| 2023/0279281 | A1 | 9/2023 | Yamashita et al. | |
| 2024/0054669 | A1 | 2/2024 | Houben et al. | |

OTHER PUBLICATIONS

U.S. Appl. No. 17/901,705, “Non-Final Office Action”, Feb. 10, 2025, 27 pages.
U.S. Appl. No. 17/947,481, “Non-Final Office Action”, Jan. 29, 2025, 30 pages.
Comon, et al., “Handbook of Blind Source Separation”, Independent Component Analysis and Applications, Feb. 17, 2010, 65 pages.
Gajowniczek, et al., “Blind Source Separation for the Aggregation of Machine Learning Algorithms: An Arrhythmia Classification Case”, Electronics, vol. 9, No. 3 Available online at: https://www.mdpi.com/2079-9292/9/3/425, Mar. 3, 2020, 14 pages.
Hyvarinen, et al., “Independent Component Analysis: Algorithms and Applications”, Neural Networks, vol. 13, No. 4-5, Jun. 2000, 31 pages.

* cited by examiner

NONDESTRUCTIVE ESTIMATION OF STRUCTURAL PROPERTIES OF A SPECIMEN VIA X-RAY MODELLING BASED ON SIMULATIONS AND GROUND TRUTH MEASUREMENTS

TECHNICAL FIELD

The present disclosure generally relates to non-destructive three-dimensional probing and characterization of specimens based on X-ray measurements.

BACKGROUND OF THE INVENTION

"Three-dimensional" structures are increasingly used in the semiconductor industry, particularly, in the manufacture of logic and memory components. Accordingly, as part of quality control, "three-dimensional" data of structures within specimens must typically be obtained. At present, most techniques for profiling of specimens, which include three-dimensional internal structures, are destructive, and may involve the extraction of lamellas, or shaving off of slices, from a specimen and subsequent inspection thereof using e.g., transmission electron microscopy (TEM). The challenge remains to develop non-destructive techniques for profiling specimens incorporating three-dimensional internal structures, which allow for high-volume manufacturing (HVM).

BRIEF SUMMARY OF THE INVENTION

Aspects of the disclosure, according to some embodiments thereof, relate to non-destructive three-dimensional probing and characterization of specimens based on X-ray measurements and analyses based on computer simulations and ground truth (GT) data related to GT (i.e., actual) specimens. More specifically, but not exclusively, aspects of the disclosure, according to some embodiments thereof, relate to non-destructive three-dimensional probing and characterization of specimens based on measurement of characteristic X-rays and modeling through extrapolation of computer simulations and GT data.

In some embodiments, the present invention provides a system for non-destructive characterization of specimens, the system comprising:

an electron beam (e-beam) source for projecting e-beams at one or more e-beam landing energies on a specimen being tested;

an X-ray detector for sensing X-rays emitted from the tested specimen; and processing circuitry configured to:

receive from the X-ray detector X-ray measurement data pertaining to one or more e-beam landing energies;

extract from the X-ray measurement data a vector $\vec{f}_{key}$ specifying values of key features of the X-ray measurement data; and estimate values $\vec{p}_s$ of one or more structural parameters of the tested specimen, based on $\vec{f}_{key}$ and a set of vectors $$\{\vec{f}_n\}_{n=1}^{N}$$

comprising $N_1$ vectors of ground truth (GT) and $N_2$ vectors of simulated key features corresponding to respective GT and simulated reference specimens, wherein $N_1+N_2=N$, and for each $1\leq n\leq N$, $\vec{p}_n$ specifies values of one or more structural parameters of an n-th specimen, and $\vec{f}_n$ is obtained for $1\leq n\leq N_1$ (GT specimens) through actual measurements and for $N_1+1\leq n\leq N$ (simulated specimens) by computer simulation, of emission of X-rays from the n-th reference specimen due to impinging thereof with e-beams at each of the one or more landing energies.

In some embodiments of the system, $\vec{p}_s$ minimizes a loss function, which is a function of at least $\vec{f}_{key}$ and a vector-valued function $\vec{f}_{ext}(\vec{p})$ of the key features, which is extrapolated from $$\{\vec{f}_n\}_{n=1}^{N}.$$

In some embodiments, the processing circuitry is configured to estimate $\vec{p}_s$ by computing a minimum distance between $\vec{f}_{key}$ and $\vec{f}_{ext}(\vec{p})$. In some embodiments, the processing circuitry is configured to estimate $\vec{p}_s$ by computing distances between $\vec{f}_{key}$ and the $\vec{f}_n$. In some embodiments of the system, $N_2>N_1$.

In some embodiments of the system, the GT specimens include specimens of a same, or a similar, intended design as the tested specimen. In some embodiments, the GT specimens include especially prepared samples exhibiting selected variations with respect to the intended design. In some embodiments, the simulated specimens are selected so as to encompass expected variations of the one or more structural parameters. In some embodiments, the one or more structural parameters comprise any geometrical and/or compositional parameter characterizing the tested specimen whose modification impacts at least some of the values of the key features.

In some embodiments of the system, the one or more structural parameters comprise one or more of an overall concentration of at least one material that the tested specimen comprises, and, optionally, when the tested specimen comprises a structure embedded therein or thereon, a width of the embedded structure.

In some embodiments of the system, the tested specimen comprises a plurality of layers. In some embodiments, the one or more structural parameters comprise one or more of (i) at least one thickness of at least one of the layers, respectively, (ii) a combined thickness of at least two or more of the layers, (iii) at least one mass density of at least one of the layers, respectively, and (vi) at least one relative concentration of at least one material, respectively, in one or more of the layers.

In some embodiments of the system, the one or more e-beam landing energies induce emission of X-rays about one or more characteristic X-ray lines pertaining to one or more target substances which the tested specimen comprises. In some embodiments, the X-ray detector is configured to sense at least one measured spectrum of the respectively emitted X-rays in at least one photon energy range, respectively, which comprises at least one of the characteristic X-ray lines. In some embodiments, the X-ray measurement data comprises the measured spectra.

In some embodiments of the system, the one or more e-beam landing energies induce emission of X-rays originating from at least two of the plurality of layers. In some embodiments, the one or more e-beam landing energies induce emission of X-rays originating from each of the plurality of layers.

In some embodiments of the system, the key features are, comprise, or are functions of intensities of the characteristic X-ray lines and/or intensities of background radiation.

In some embodiments of the system, the key features are, or comprise, the intensities of the characteristic X-ray lines, each normalized by a mean of the background intensity about the respective characteristic X-ray line. In some embodiments, the key features are extracted from difference spectra obtained for the tested specimen by subtracting control spectra of a control specimen from the measured spectra of the tested specimen.

In some embodiments of the system, the processing circuitry is configured to estimate the values $\vec{p}_s$ of the one or more structural parameters of the tested specimen by treating the $N_1$ vectors of GT key features differently from the $N_2$ vectors of simulated key features, such that the estimate is more affected by GT data than by simulated data.

In some embodiments of the system, $$\vec{p}_s = \underset{\vec{p}}{\operatorname{argmin}} \left\| \vec{f}_{key} - \vec{f}_{ext}(\vec{p}) \right\|$$

with the double vertical bars denoting a vector norm.

In some embodiments of the system, $\vec{f}_{ext}(\vec{p}) = \vec{f}_{ext}(\vec{p}_0 + \vec{\delta}) = \vec{f}_0 + A\vec{\delta}$ with $\vec{p}_0$ specifying nominal values of the one or more structural parameters, $\vec{\delta}$ specifying deviations from the nominal values, $\vec{f}_0$ being a vector of values of the key features corresponding to $\vec{p}_0$, and A being a matrix.

In some embodiments of the system, the matrix A equals $$\underset{B}{\operatorname{argmin}} \left\| \begin{pmatrix} \left(\vec{f}_1 - \vec{f}_0 - B\vec{\delta}_1\right)^T \\ \left(\vec{f}_2 - \vec{f}_0 - B\vec{\delta}_2\right)^T \\ \vdots \\ \left(\vec{f}_N - \vec{f}_0 - B\vec{\delta}_N\right)^T \end{pmatrix} \right\|$$

with the double vertical bars denoting a matrix norm and, for each $1 \le n \le N$, $\vec{\delta}_n = \vec{p}_n - \vec{p}_0$.

In some embodiments of the system, $\vec{f}_0$ and the matrix A are obtained as the solution of $$\underset{\vec{g}, B}{\operatorname{argmin}} \left\| \begin{pmatrix} \left(\vec{f}_1 - \vec{g} - B\vec{\delta}_1\right)^T \\ \left(\vec{f}_2 - \vec{g} - B\vec{\delta}_2\right)^T \\ \vdots \\ \left(\vec{f}_N - \vec{g} - B\vec{\delta}_N\right)^T \end{pmatrix} \right\|$$

with the double vertical bars denoting a matrix norm and, for each $1 \le n \le N$, $\vec{\delta}_n = \vec{p}_n - \vec{p}_0$. It is appreciated that $\vec{f}_0$ may be obtained from simulated specimens, GT specimens, or both.

In some embodiments of the system, the matrix A equals $$\underset{B}{\operatorname{argmin}} \sum_{i=1}^{N} \alpha_i \left\| \vec{f}_i - \vec{f}_0 - B\vec{\delta}_i \right\|^2,$$

wherein the double vertical bars denote a vector norm; for each $1 \le n \le N$, $\vec{\delta}_n = \vec{p}_n - \vec{p}_0$; and $\alpha_i$ has a different value for GT data and for simulated data.

In some embodiments of the system, $\vec{f}_0$ and the matrix A are obtained as the solution of $$\underset{\vec{g}, B}{\operatorname{argmin}} \sum_{i=1}^{N} \alpha_i \left\| \vec{f}_i - \vec{g} - B\vec{\delta}_i \right\|^2,$$

wherein the double vertical bars denote a vector norm; for each $1 \le n \le N$, $\vec{\delta}_n = \vec{p}_n - \vec{p}_0$; and $\alpha_i$ has a different value for GT data and for simulated data.

In some embodiments of the system, $\vec{f}_0$ is a product of a computer simulation of emission of X-rays from a simulated specimen, which is characterized by $\vec{p}_0$, due to impinging thereof with e-beams at each of the one or more landing energies.

In some embodiments of the system, the processing circuitry is configured to, as part of estimating $\vec{p}_s$, apply a k-nearest neighbor (k–NN) regression algorithm to $\vec{f}_{key}$ with respect to $$\{\vec{f}_n\}_{n=1}^{N}$$

in order to determine k vectors of the $\vec{f}_n$, which are closest to $\vec{f}_{key}$.

In some embodiments of the system, the k–NN algorithm is biased towards GT data points.

In some embodiments of the system, $\vec{p}_s$ is an average or a median, optionally weighted, of the $\vec{p}_n$ corresponding to the k closest $\vec{f}_n$ vectors. In some embodiments, $\vec{p}_s$ is the weighted average or median of the $\vec{p}_n$ corresponding to the k closest $\vec{f}_n$ vectors, and $\vec{p}_n$ derived from GT specimens are assigned a higher weight than $\vec{p}_n$ derived from simulated specimens.

In some embodiments of the system, the processing circuitry is further configured to obtain $$\{\vec{f}_n\}_{n=1}^{N}$$

by subjecting $\vec{f}_{key}$ to an (k=N)–NN classifier with respect to a set of $$\{\vec{f}_{n'}\}_{n'=1}^{N'}$$

vectors of key features, wherein N'>N and $\vec{f}_{n'}$ comprises $\vec{f}_n$, and the additional N'–N vectors are obtained by actual the measurements of additional GT specimens and/or by applying the computer simulations with respect to additional simulated specimens.

In some embodiments of the system, the processing circuitry is further configured to obtain $$\{\vec{f}_n\}_{n=N+1}^{N}$$

by subjecting $\vec{f}_{key}$ to an $(k=N_2)$–NN classifier with respect to a set of $$\{\vec{f}_{n'}\}_{n'=N1+1}^{N'}$$

vectors of key features, wherein N'>N and $\vec{f}_{n'}$ comprises $\vec{f}_n$, and the additional N'–N vectors are obtained by applying the computer simulations with respect to additional simulated specimens.

In some embodiments of the system, in order to derive the intensities of the characteristic X-ray lines, the processing circuitry is configured to fit a free curve onto each interval of the measured spectra, which is about centered about a respective characteristic X-ray line and constituted by a vicinity of the characteristic X-ray line, thereby obtaining a respective optimized curve.

In some embodiments of the system, the free curve is a sum of functions, which comprises a bulge-shaped function and a second function, which is a polynomial.

In some embodiments of the system, the processing circuitry is configured to, as part of the fitting of the free curve, fit the bulge-shaped function onto a peak about the characteristic X-ray line of the respective measured spectrum, and fit the second function so as to account for a background intensity component of the respective measured spectrum.

In some embodiments of the system, the processing circuitry is further configured to extrapolate $\vec{f}_{ext}(\vec{p})$ from the $$\{\vec{f}_n\}_{n=1}^{N}.$$

In some embodiments of the system, the X-ray detector is an energy-dispersive X-ray spectrometer or a wavelength-dispersive X-ray spectrometer.

In some embodiments of the system, the tested specimen is a patterned wafer, or a part of patterned wafer, optionally, in one of the fabrication stages thereof.

In some embodiments, the present invention provides a method for non-destructive characterization of specimens, the method comprising:

- a measurement operation comprising, for each of one or more landing energies, suboperations of:
  - projecting an e-beam on a tested specimen; and
  - obtaining measurement data by measuring intensity of X-rays emitted from the tested specimen due to penetration of the e-beam thereinto; and
- a measurement data analysis operation comprising suboperations of:
  - extracting from the measurement data a vector $\vec{f}_{key}$ specifying values of key features; and
  - estimating values $\vec{p}_s$ of one or more structural parameters of the tested specimen based on $\vec{f}_{key}$ and a set of vectors $$\{\vec{f}_n\}_{n=1}^{N}$$

comprising $N_1$ vectors of ground truth (GT) and $N_2$ vectors of simulated key features corresponding to respective GT and simulated specimens, wherein $N_1+N_2=N$, and for each $1 \le n \le N$, $\vec{p}_n$ specifies values of one or more structural parameters of an n-th specimen, and $\vec{f}_n$ is obtained for $1 \le n \le N_1$ (GT specimens) through measurements and for $N_1+1 \le n \le N$ (simulated specimens) by computer simulation, of emission of X-rays from the n-th specimen due to impinging thereof with e-beams at each of the one or more landing energies.

In some embodiments of the method, $\vec{p}_s$ minimizes a loss function, which is a function of at least $\vec{f}_{key}$ and a vector-valued function $\vec{f}_{ext}(\vec{p})$ of the key features, which is extrapolated from $$\{\vec{f}_n\}_{n=1}^{N}.$$

In some embodiments, the method further comprises estimating p's by computing a minimum distance between $\vec{f}_{key}$ and $\vec{f}_{ext}(\vec{p})$. In some embodiments, the method further comprises estimating $\vec{p}_s$ by computing distances between $\vec{f}_{key}$ and the $\vec{f}_n$.

In some embodiments of the method, $N_2>N_1$.

In some embodiments of the method, the GT specimens include specimens of a same, or a similar, intended design as the tested specimen. In some embodiments, the GT specimens include especially prepared samples exhibiting selected variations with respect to the intended design. In some embodiments, the simulated specimens are selected so as to encompass expected variations of the one or more structural parameters. In some embodiments, the one or more structural parameters comprise any geometrical and/or compositional parameter characterizing the tested specimen whose modification impacts at least some of the values of the key features.

In some embodiments of the method, the one or more structural parameters comprise one or more of an overall concentration of at least one material that the tested specimen comprises, and, optionally, when the tested specimen comprises a structure embedded therein or thereon, a width of the embedded structure.

In some embodiments of the method, the tested specimen comprises a plurality of layers. In some embodiments, the one or more structural parameters comprise one or more of (i) at least one thickness of at least one of the layers, respectively, (ii) a combined thickness of at least two or more of the layers, (iii) at least one mass density of at least one of the layers, respectively, and (vi) at least one relative concentration of at least one material, respectively, in one or more of the layers.

In some embodiments of the method, the one or more e-beam landing energies are selected so as to induce emission of X-rays about one or more characteristic X-ray lines pertaining to one or more target substances which the tested specimen comprises. In some embodiments, in each implementation of the suboperations of projecting the e-beam and obtaining the measurement data, obtained is at least one measured spectrum of the respectively emitted X-rays in at least one photon energy range, respectively, which comprises at least one of the characteristic X-ray lines. In some embodiments, the X-ray measurement data comprises the measured spectra.

In some embodiments of the method, the one or more e-beam landing energies are selected so as to induce emission of X-rays originating from at least two of the plurality of layers. In some embodiments, the one or more e-beam landing energies induce emission of X-rays originating from each of the plurality of layers.

In some embodiments of the method, the key features are, comprise, or are functions of intensities of the characteristic X-ray lines and/or intensities of background radiation.

In some embodiments of the method, the key features are, or comprise, the intensities of the characteristic X-ray lines, each normalized by a mean of the background intensity about the respective characteristic X-ray line. In some embodiments, the key features are extracted from difference spectra obtained for the tested specimen by subtracting control spectra of a control specimen from the measured spectra of the tested specimen.

In some embodiments of the method, $$\vec{p}_s - \underset{\vec{p}}{\operatorname{argmin}}\left\|\vec{f}_{key} - \vec{f}_{ext}(\vec{p})\right\|$$

with the double vertical bars denoting a vector norm.

In some embodiments of the method, estimating values $\vec{p}_s$ of one or more structural parameters of the tested specimen comprises treating the $N_1$ vectors of GT key features differently from the $N_2$ vectors of simulated key features, such that the resulting estimate is more affected by GT data than by simulated data.

In some embodiments of the method, $\vec{f}_{ext}(\vec{p})=\vec{f}_{ext}(\vec{p}_0+\vec{\delta})=\vec{f}_0+A\vec{\delta}$ with $\vec{p}_0$ specifying nominal values of the one or more structural parameters, $\vec{\delta}$ specifying deviations from the nominal values, $\vec{f}_0$ being a vector of values of the key features corresponding to $\vec{p}_0$, and A being a matrix.

In some embodiments of the method, the matrix A equals $$\underset{B}{\operatorname{argmin}}\left\|\begin{pmatrix}\left(\vec{f}_1-\vec{f}_0-B\vec{\delta}_1\right)^T\\ \left(\vec{f}_2-\vec{f}_0-B\vec{\delta}_2\right)^T\\ \vdots\\ \left(\vec{f}_N-\vec{f}_0-B\vec{\delta}_N\right)^T\end{pmatrix}\right\|$$

with the double vertical bars denoting a matrix norm and, for each $1\le n\le N$, $\vec{\delta}_n=\vec{p}_n-\vec{p}_0$.

In some embodiments of the method, $\vec{f}_0$ and the matrix A are obtained as the solution of $$\underset{\vec{g},B}{\operatorname{argmin}}\left\|\begin{pmatrix}\left(\vec{f}_1-\vec{g}-B\vec{\delta}_1\right)^T\\ \left(\vec{f}_2-\vec{g}-B\vec{\delta}_2\right)^T\\ \vdots\\ \left(\vec{f}_N-\vec{g}-B\vec{\delta}_N\right)^T\end{pmatrix}\right\|$$

with the double vertical bars denoting a matrix norm and, for each $1\le n\le N$, $\vec{\delta}_n=\vec{p}_n-\vec{p}_0$.

In some embodiments of the method, the matrix A equals $$\underset{B}{\operatorname{argmin}}\sum_{i=1}^{N}\alpha_i\left\|\vec{f}_i-\vec{f}_0-B\vec{\delta}_i\right\|^2,$$

wherein the double vertical bars denote a vector norm; for each $1\le n\le N$, $\vec{\delta}_n=\vec{p}_n-\vec{p}_0$; and $\alpha_i$ has a different value for GT data and for simulated data.

In some embodiments of the method, $\vec{f}_0$ and the matrix A are obtained as the solution of $$\underset{\vec{g},B}{\operatorname{argmin}}\sum_{i=1}^{N}\alpha_i\left\|\vec{f}_i-\vec{g}-B\vec{\delta}_i\right\|^2,$$

wherein the double vertical bars denote a vector norm; for each $1\le n\le N$, $\vec{\delta}_n=\vec{p}_n-\vec{p}_0$; and $\alpha_i$ has a different value for GT data and for simulated data.

In some embodiments of the method, $\vec{f}_0$ is a product of computer simulation of emission of X-rays from a simulated specimen, which is characterized by $\vec{p}_0$, due to impinging thereof with e-beams at each of the one or more landing energies.

In some embodiments of the method, as part of estimating $\vec{p}_s$, the method further comprises applying a k-nearest neighbor (k–NN) regression algorithm to $\vec{f}_{key}$ with respect to $$\{\vec{f}_n\}_{n=1}^{N}$$

in order to determine k vectors of the $\vec{f}_n$, which are closest to $\vec{f}_{key}$.

In some embodiments of the method, the k–NN algorithm is biased towards GT data points.

In some embodiments of the method, $\vec{p}_s$ is an average or a median, optionally weighted, of the $\vec{p}_n$ corresponding to the k closest $\vec{f}_n$ vectors. In some embodiments, $\vec{p}_s$ is the weighted average or median of the $\vec{p}_n$ corresponding to the k closest $\vec{f}_n$ vectors, and $\vec{p}_n$ derived from GT specimens are assigned a higher weight than $\vec{p}_n$ derived from simulated specimens.

In some embodiments of the method, the method further comprises obtaining $$\{\vec{f}_n\}_{n=1}^{N}$$

by subjecting $\vec{f}_{key}$ to an (k=N)-NN classifier with respect to a set of $$\{\vec{f}_{n'}\}_{n'=1}^{N'}$$

vectors of key features, wherein N'>N and $\vec{f}_{n'}$ comprises $\vec{f}_n$, and the additional N'−N vectors are obtained by actual the measurements of additional GT specimens and/or by applying the computer simulations with respect to additional simulated specimens.

In some embodiments of the method, the method further comprises obtaining $$\{\vec{f}_n\}_{n=N+1}^{N}$$

by subjecting $\vec{f}_{key}$ to an (k=$N_2$)-NN classifier with respect to a set of $$\{\vec{f}_{n'}\}_{n'=N1+1}^{N'}$$

vectors of key features, wherein N'>N and $\vec{f}_{n'}$ comprises $\vec{f}_n$, and the additional N'−N vectors are obtained by applying the computer simulations with respect to additional simulated specimens.

In some embodiments of the method, in order to derive the intensities of the characteristic X-ray lines, the method fits a free curve onto each interval of the measured spectra, which is about centered about a respective characteristic X-ray line and constituted by a vicinity of the characteristic X-ray line, thereby obtaining a respective optimized curve.

In some embodiments of the method, the free curve is a sum of functions, which comprises a bulge-shaped function and a second function, which is a polynomial.

In some embodiments of the method, the method further comprises, as part of the fitting of the free curve, to fit the bulge-shaped function onto a peak about the characteristic X-ray line of the respective measured spectrum, and fit the second function so as to account for a background intensity component of the respective measured spectrum.

In some embodiments of the method, the method further comprises extrapolating $\vec{f}_{ext}(\vec{p})$ from the $$\{\vec{f}_n\}_{n=1}^{N}.$$

In some embodiments of the method, the tested specimen is a patterned wafer, or a part of patterned wafer, optionally, in one of the fabrication stages thereof.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure. In the figures.

DETAILED DESCRIPTION OF THE INVENTION

Figure 1:
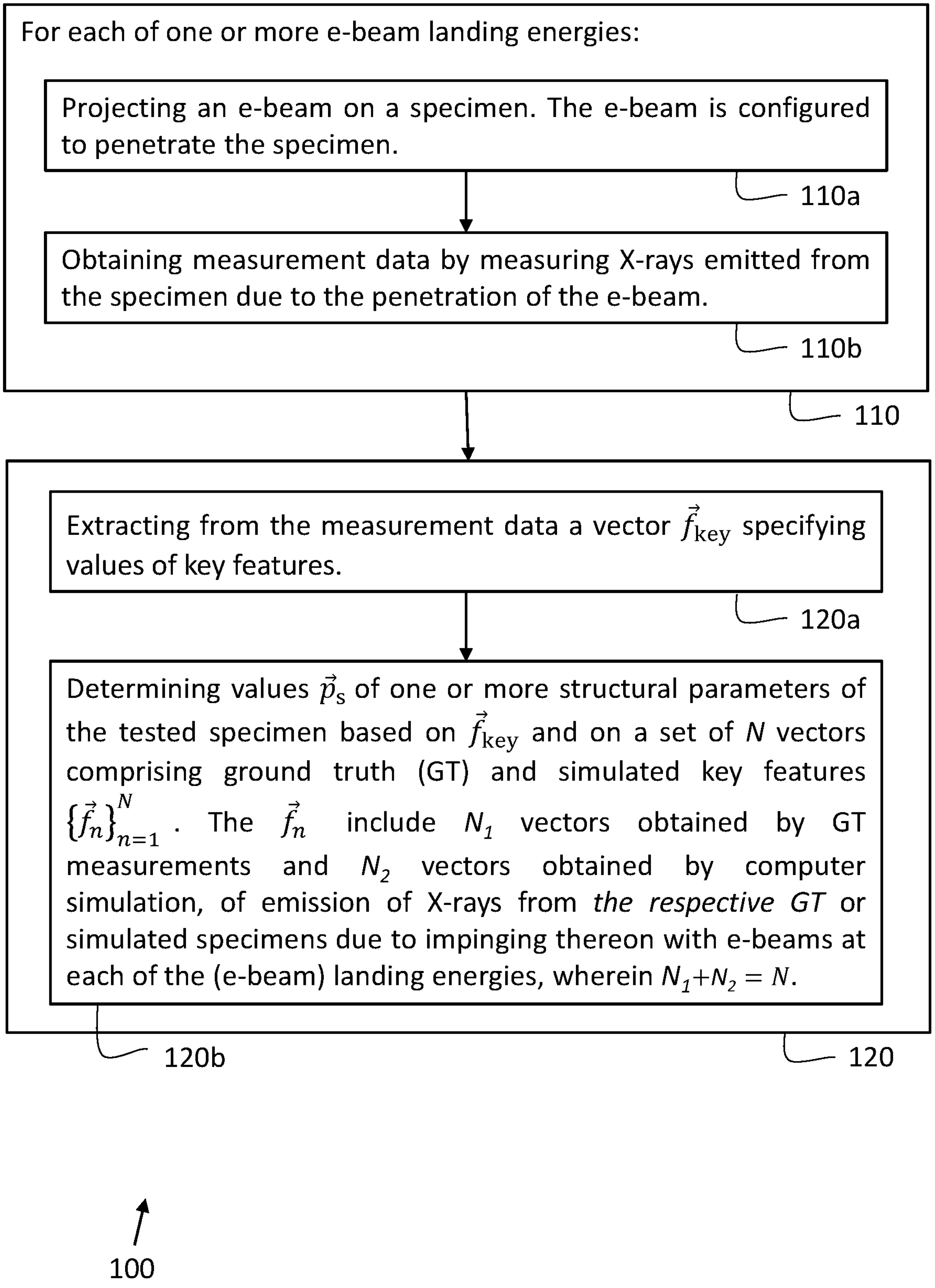
FIG. 1 presents a flowchart of a method for non-destructive three-dimensional probing and characterization of tested specimens based on X-ray measurements of the tested specimens, and analyses based on computer simulation and GT data, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

The present application is directed to methods and systems for non-destructive three-dimensional probing and characterization of tested specimens (e.g., semiconductor specimens). In principle, the methods of the invention are based on analyzing X-ray emission profiles measured for a tested specimen (having unknown structural parameters) and a set of reference data including ground truth (GT) emission profiles of GT specimens (having actually measured, i.e., non-simulated, structural parameters) and simulated emission profiles of simulated specimens (characterized by suitably selected values of structural parameters), in order to estimate values of the structural parameters of the tested specimen.

In more detail, according to some embodiments, e-beams at each of a plurality of (e-beam) landing energies are projected on a tested specimen, which is to be depth-profiled. Each e-beam penetrates into the specimen and excites emission of characteristic X-rays therefrom (and accompanying bremsstrahlung, i.e., background radiation). The greater the e-beam landing energy, the greater the depth to which the e-beam penetrates the specimen.

The spectrum of the emitted X-rays depends on the internal geometry of the specimen and the material composition thereof, in particular, the distribution of each material (i.e., substance) making up the specimen. As an e-beam travels through a specimen, the e-beam "probes" different regions it traverses. The contribution of each traversed region to the spectrum of the emitted X-rays depends not only on the concentration of each material included in the traversed region but also on the energy of the e-beam on entry thereto, which, in turn, decreases with the depth.

Since the spectra of emitted X-rays, as well as key features thereof, typically depend on the structural parameters of the tested specimen, the unknown structural parameters of the tested specimen may be estimated by processing values of key features of the spectra of emitted X-rays and values of key features of emitted X-rays spectra obtained in similar experiments from GT specimens having physically measured structural parameters. However, since physical measurements of structural parameters usually require destruction of the GT specimens and are rather costly and time consuming, simulated specimens may be used in addition to the GT specimens, as explained below.

The term "key features", as used herein, relates to selected features of X-ray measurements (either actually measured or simulated), e.g., intensities of characteristic X-ray lines, which are characteristic of, or correlate with, values of structural parameters of the respective specimen.

Accordingly, the present application teaches how to characterize internal structural parameters of a tested specimen without destroying the specimen, based on values of key features extracted from measured spectra of the tested specimen. The measured spectra may be analyzed using optimization tools based on GT measurements and computer simulations of specimens and measurement setup employed to obtain the measured spectra. Advantageously, by using simulated specimens, the disclosed methods and systems may be used with a small number of GT specimens, which are costly and time-consuming to obtain. In particular, the time between the design of a semiconductor device and its testing and mass production may potentially thus be reduced.

Methods

According to an aspect of some embodiments, there is provided a computerized method for non-destructive, three-dimensional, characterization of a tested specimen including estimating values of structural parameters of the tested specimen through measurement of characteristic X-rays returned from the tested specimen, and on processing of measurement data taking into account GT data and simulated data, as explained in more detail below. FIG. 1 presents a flowchart of exemplary method 100, according to some embodiments, including:

- A measurement operation 110, which includes, for each of (one or more) e-beam landing energies (i.e., landing energies of the e-beams), performing:
  - A suboperation 110*a*, wherein an e-beam is projected on a specimen (also referred to as "the tested specimen").
  - A suboperation 110*b*, wherein measurement data is obtained by measuring intensity of X-rays emitted from the tested specimen due to penetration of the e-beam.
- A data analysis operation 120 including:
  - A suboperation 120*a*, wherein values of key features of the tested specimen, specified by a vector $\vec{f}_{key}$, are extracted from the measurement data.
  - A suboperation 120*b*, wherein values $\vec{p}_s$ of one or more structural parameters of the tested specimen are estimated based on $\vec{f}_{key}$ and a set of vectors $$\{\vec{f}_n\}_{n=1}^{N},$$

including (i) $N_1$ vectors of key features obtained by implementing measurement operation 110 with respect to $N_1$ GT specimens, and (ii) $N_2$ vectors of key features obtained by computer simulations of $N_2$ simulated specimens, wherein $N_1+N_2=N$. The computer simulations simulate the emission of X-rays from the $N_2$ simulated specimens, respectively, due to impinging thereon with e-beams at each of the (e-beam) landing energies.

Figure 5:
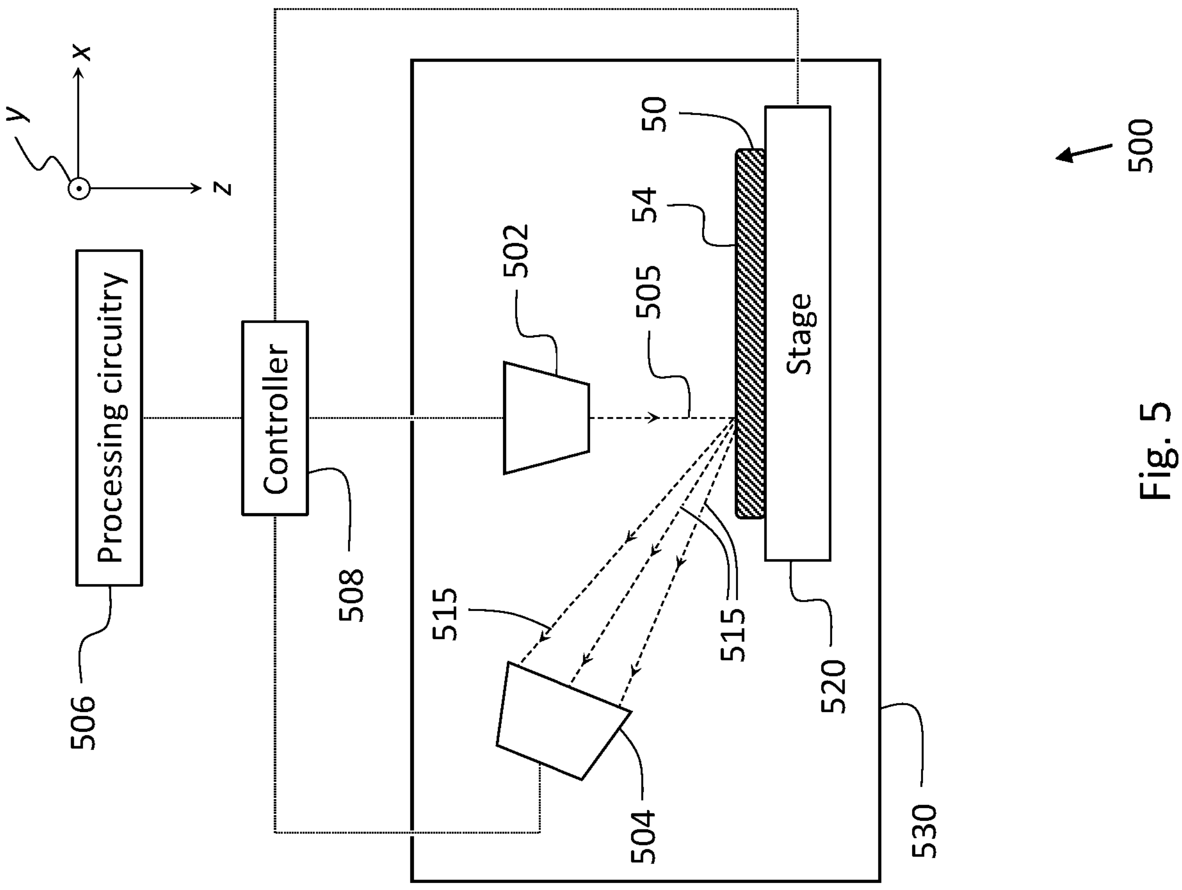
FIG. 5 schematically depicts a system for non-destructive three-dimensional probing and characterization of tested specimens based on X-ray measurements of the tested specimens, and analyses based on computer simulation and GT data, according to some embodiments.

The methods of the invention may be implemented, for example, by using a system, such as the system described below in the description of FIG. 5, or systems similar thereto.

The terms "bremsstrahlung" and "background radiation" are used herein interchangeably.

According to some embodiments, the tested specimen is selected from a patterned wafer, a part of a patterned wafer, a semiconductor device embedded in or on a patterned wafer, such as a gated stack, optionally, in one of the fabrication stages of the patterned wafer. According to some embodiments, the tested specimen is or includes a structure including one or more semiconductor materials. According to some embodiments, the structure may be constructed as part of a manufacturing processes of semiconductor devices and/or components of semiconductor devices. According to some embodiments, the structure may be an assist structure, which is constructed as part of a manufacturing processes of semiconductor devices and/or components of semiconductor devices. According to some embodiments, the tested specimen may be or includes one or more logic components (e.g., a fin FET (FinFET), a gate-all-around (GAA) FET), memory components (e.g., a dynamic RAM, and/or a vertical NAND (V-NAND)), optionally in one of the fabrication stages thereof.

According to some embodiments, the tested specimen includes a single layer. According to some embodiments, the tested specimen includes two or more layers.

In some embodiments, the tested specimen and the GT specimens all have the same or similar structure. For example, the tested specimen and the GT specimen may all include the same number of layers, or are all of the same type of structure such as a patterned wafer or a semiconductor device. In some embodiments, the tested specimen and the GT specimens are all made from the same materials. By "same or similar" it is meant that the tested specimen and the GT specimens are defined by the same type of structure (such as a patterned wafer, a part of a patterned wafer, a semiconductor device embedded in or on a patterned wafer, such as a gated stack, etc., as defined above), but may have different measurements (values of structural parameters) such as height, length, thickness of layers, concentration of materials in each layer, etc.

The term "structural parameters", as used herein, relates to physical properties of a specimen, either measured or simulated. According to some embodiments, the one or more structural parameters may include one or more of an overall concentration of at least one material that the tested specimen includes, and, optionally, when the tested specimen includes a structure embedded therein or thereon, a width of the embedded structure (e.g., the width of a gate, a fin, or a depletion layer).

More generally, the one or more structural parameters may include any geometrical parameter and/or compositional parameter of the tested specimen whose modification impacts at least some of the components of $\vec{f}_{key}$ in a measurable manner so as to allow estimating the values of the one or more structural parameters, characterizing the tested specimen, as described above and in more detail below.

Additionally, or alternatively, according to some embodiments wherein the tested specimen includes one or more layers, the one or more structural parameters may include one or more of (i) at least one thickness of at least one of the layers, respectively, (ii) a combined thickness of at least two or more of the layers, (iii) at least one mass density of at least one of the layers, respectively, and (iv) at least one relative concentration of at least one material, respectively, in one or more of the layers. By way of a non-limiting example, with respect to item (iv), the one or more structural parameters may include the relative concentration of a first material in a subset of the layers, e.g., adjacent layers or layers of a first type (potentially nonadjacent). The relative concentration of the first material in the subset (of the layers) may correspond to the overall number of particles of the first material, included in the subset, divided by the overall number of particles (of all materials, including the first material) included in the subset.

According to some such embodiments, the one or more structural parameters include structural parameters of at least one of the two or more layers.

The first step of the method (exemplified in measurement operation 110 of FIG. 1) involves measurements including measuring intensity of X-rays emitted from the tested specimen due to penetration of the e-beam.

The term "e-beam", as used herein, stands for "electron beam". The term "characteristic X-rays regime" refers to a photon energy range (i.e., an energy range of a photon, or, equivalently, frequency range) within the X-ray spectrum, which includes characteristic X-ray lines.

Parameters characterizing the e-beam, particularly the e-beam landing energies, are selected so as to induce in suboperation 110*a* emission of characteristic X-rays by particles (specifically, particles of at least one target substance) in a probed region centered about a respective depth, which depends on the e-beam landing energy. More precisely, each probed region may correspond to a respective volume of the tested specimen, wherein electrons from the respective e-beam may cause ejections of electrons in the inner shells of atoms (in the probed region), leaving each of these atoms with an inner shell vacancy. The inner shell vacancy may be filled through the relaxation of an outer shell electron to the inner shell. The relaxation may be accompanied by emission of a photon (having energy equal to the energy lost by the electron in transitioning from the outer shell to the inner shell).

According to some embodiments, the number of e-beam landing energies, and the minimum and maximum e-beam landing energies, may be selected to ensure that the tested specimen is probed over a range of depths. According to some such embodiments, the number of e-beam landing energies, and the minimum and maximum e-beam landing energies, may be selected to ensure that the tested specimen is probed all along the depth-dimension thereof.

According to some embodiments, in each implementation of suboperation 110*b*, at least one measured spectrum is obtained. Each of the measured spectra may correspond to a photon energy range, or a respective photon energy range, which includes at least one characteristic X-ray line pertaining to at least one target substance, respectively. The measurement data include (e.g., are constituted by) the measured spectra.

As used herein, the term "target substance" is used to refer to a substance (i.e., material), which is included in a tested specimen and whose spectrum, at least about one characteristic X-ray line of the substance, is measured as part of measurement operation 110 (i.e., when method 100 is applied to the tested specimen).

According to some embodiments, $\vec{f}_{key}$ (a vector of values of key features of the tested specimen) is, includes, or is obtained or extracted from (i.e., is a function of) the measured spectra of characteristic X-ray lines. More specifically, according to some embodiments, each component of $\vec{f}_{key}$ may be derived based on a set of extracted parameters characterizing the shape of a spectral peak about the respective characteristic X-ray line. According to some embodiments, the key features are, include, or are functions of intensities of the characteristic X-ray lines and/or intensities of background radiation. According to some embodiments, the key features include (e.g., are constituted by) a so-called "energy signature". According to some embodiments, each component of the energy signature may correspond to an absolute, normalized, or relative intensity of a respective characteristic X-ray line. Each possibility corresponds to separate embodiments. According to some embodiments, each component of the energy signature may correspond to an intensity of a respective characteristic X-ray line normalized by a mean background intensity about the characteristic X-ray line. Various ways, whereby the energy signature may be derived, are described below in the description of FIGS. 4A-4E.

According to some embodiments, and as expanded on below, for example, in the description of FIGS. 4A-4E, for each of the at least one target substance, and for each e-beam landing energy, in suboperation 110*b*, an X-ray emission spectrum in a photon energy range, which includes a characteristic X-ray line of the target substance, is measured. According to some embodiments, suboperation 110*b* may be implemented using an energy-dispersive X-ray (EDX) spectrometer and/or a wavelength-dispersive X-ray (WDX) spectrometer. According to some embodiments, and as elaborated on below in the description of suboperation 120*a*, in order to derive $\vec{f}_{key}$, onto each of the X-ray emission spectra a respective curve is fitted.

According to some embodiments, the photon energy range over which the X-ray emission spectra are measured may be narrow in the sense of being limited to a vicinity (e.g., about three times, about five times, or even about ten times the width) of a characteristic X-ray line, or an immediate vicinity of the characteristic X-ray line, of a target substance. Pertinent non-limiting examples include embodiments wherein a WDX spectrometer is used to obtain the measured spectra. Alternatively, according to some embodiments, and as described in more detail below, an X-ray detector and an optical filter may be employed to measure the intensity of the emitted X-rays at or about a characteristic X-ray line of a target substance.

Figure 2A:
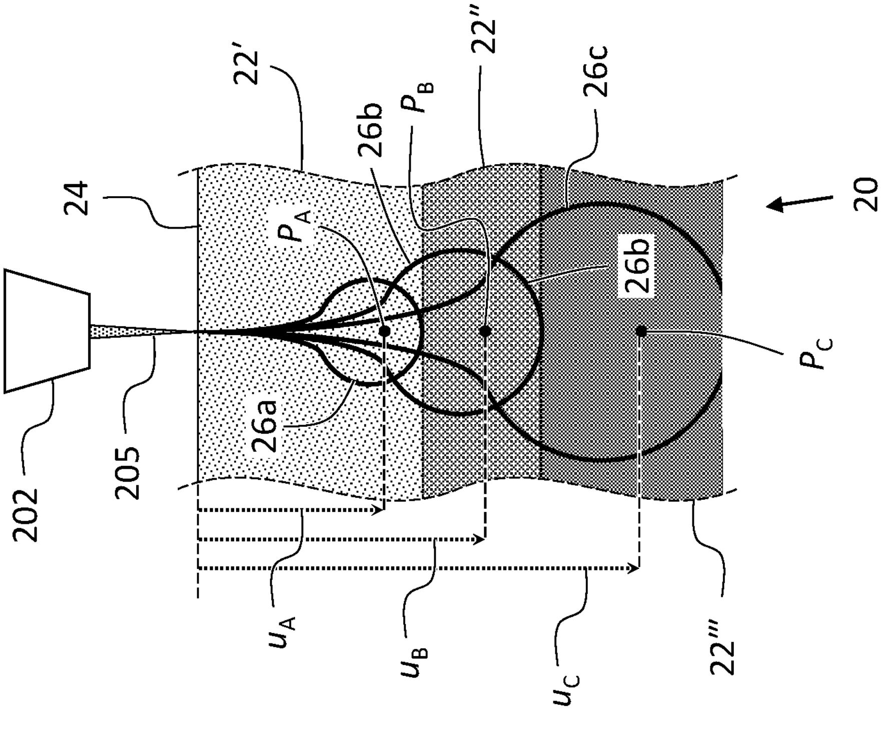
FIGS. 2A to 2D schematically depict a specimen being depth-probed as part of characterization thereof in accordance with the method of FIG. 1, according to some embodiments.

To facilitate the description, reference is additionally made to FIGS. 2A-2D. FIGS. 2A-2D schematically depict an implementation of measurement operation 110 of method 100, according to some embodiments thereof. FIG. 2A shows a cross-sectional view of a specimen 20 being probed by an e-beam in accordance with measurement operation 110. To render the description more concrete, it is assumed that specimen 20 includes a plurality of lateral (i.e., horizontal) layers 22 with at least some of layers 22 differing from one another in material composition (e.g., in the concentrations of one or more of the target substances). According to some embodiments, at least some of layers 22 may differ from one another in thickness.

As a non-limiting example, in FIGS. 2A-2D specimen 20 is shown as including three layers disposed one on top of the other: a first layer 22', a second layer 22", and a third layer 22". First layer 22' is disposed above second layer 22". Second layer 22" is sandwiched between first layer 22' and third layer 22". The top surface of first layer 22' constitutes an external surface 24 of specimen 20. Also shown is an e-beam source 202 and an e-beam 205 produced thereby, so as to impinge (e.g., normally impinge) on external surface 24. E-beam source 202 may be configured to project e-beams (one at a time) at each of a plurality of e-beam landing energies, thereby implementing suboperation 110*a*.

The greater the landing energy of e-beam 205, the greater the depth to which electrons from e-beam 205 will (on average) penetrate into specimen 20. Further, the greater the landing energy of e-beam 205, the greater may be the volume within the specimen wherein electrons from e-beam 205 interact with matter in specimen 20 so as to induce emission of characteristic X-rays. This is exemplified in FIG. 2A via three probed regions 26: A first probed region 26*a* corresponds to the volume in which about all (e.g., at least 80%, at least 90%, or at least 95%) of the characteristic X-ray (i.e., electromagnetic X-ray radiation) emitting interactions will occur due to the penetration into specimen 20 of an e-beam at a first e-beam landing energy $E_1$. A second probed region 26*b* corresponds to the volume in which about all of the characteristic X-ray emitting interactions will occur due to the penetration into specimen 20 of an e-beam at a second e-beam landing energy $E_2$. A third probed region 26*c* corresponds to the volume in which about all of the characteristic X-ray emitting interactions will occur due to the penetration into specimen 20 of an e-beam at a third e-beam landing energy $E_3$. First probed region 26*a* is centered about a first point $P_1$ at a depth $u_1$, second probed region 26*b* is centered about a second point $P_2$ at a depth $u_2$, and third probed region 26*c* is centered about a third point $P_3$ at a depth $u_3$. $E_1<E_2<E_3$. Accordingly, $u_1<u_2<u_3$. According to some embodiments, and as depicted in FIG. 2A, third probed region 26*c* is of greater size than second probed region 26*b*, which is of greater size than first probed region 26*a*.

Figure 2B:
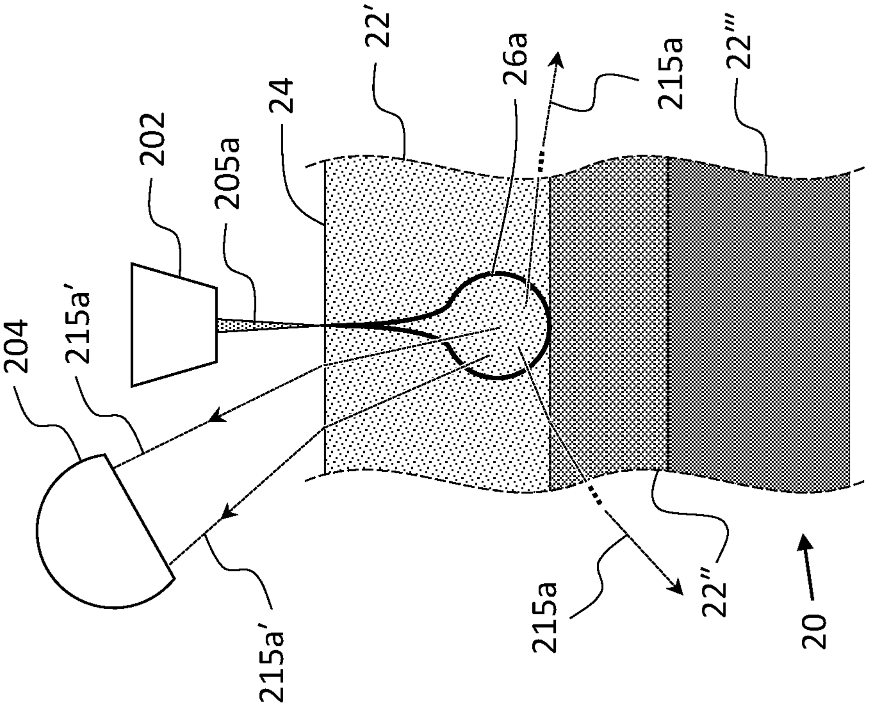

FIG. 2B shows a first e-beam 205*a*, generated by e-beam source 202 and having the first e-beam landing energy $E_1$, incident on specimen 20. Also delineated is first probed region 26*a* (in which about all the characteristic X-ray emitting interactions, induced by first e-beam 205*a*, occur). X-rays may be emitted in all directions, as exemplified by X-rays 215*a*. X-rays 215*a'* indicate X-rays (from X-rays 215*a*), which arrive at an X-ray detector 204 (such as the X-ray detector of FIG. 5).

Figure 2D:
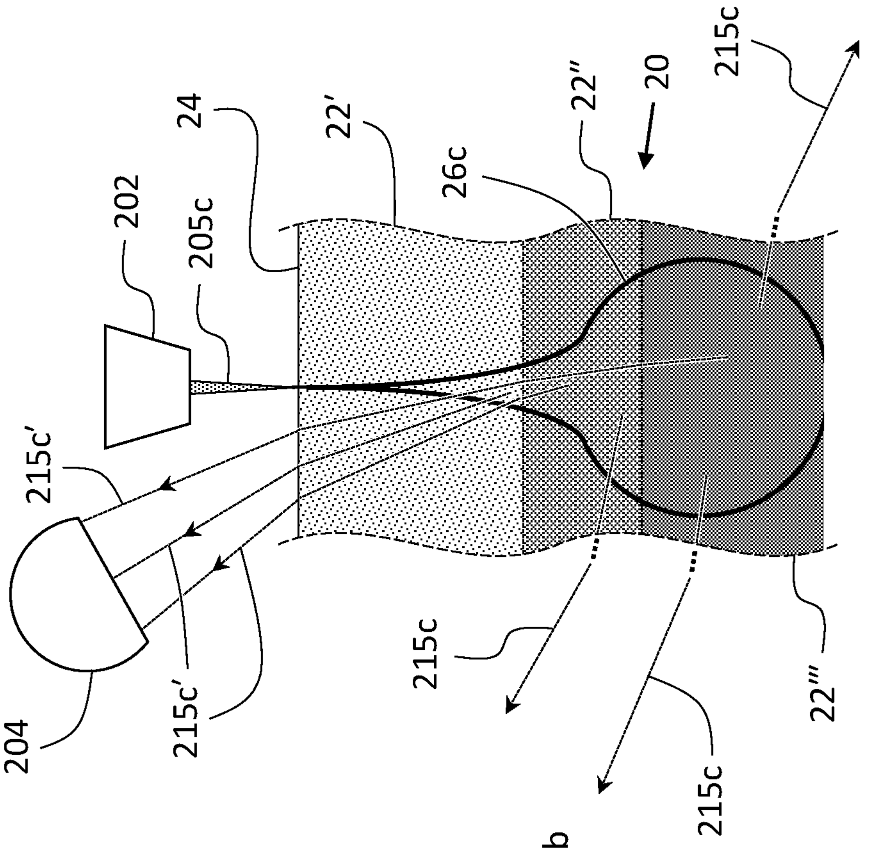
Figure 2C:
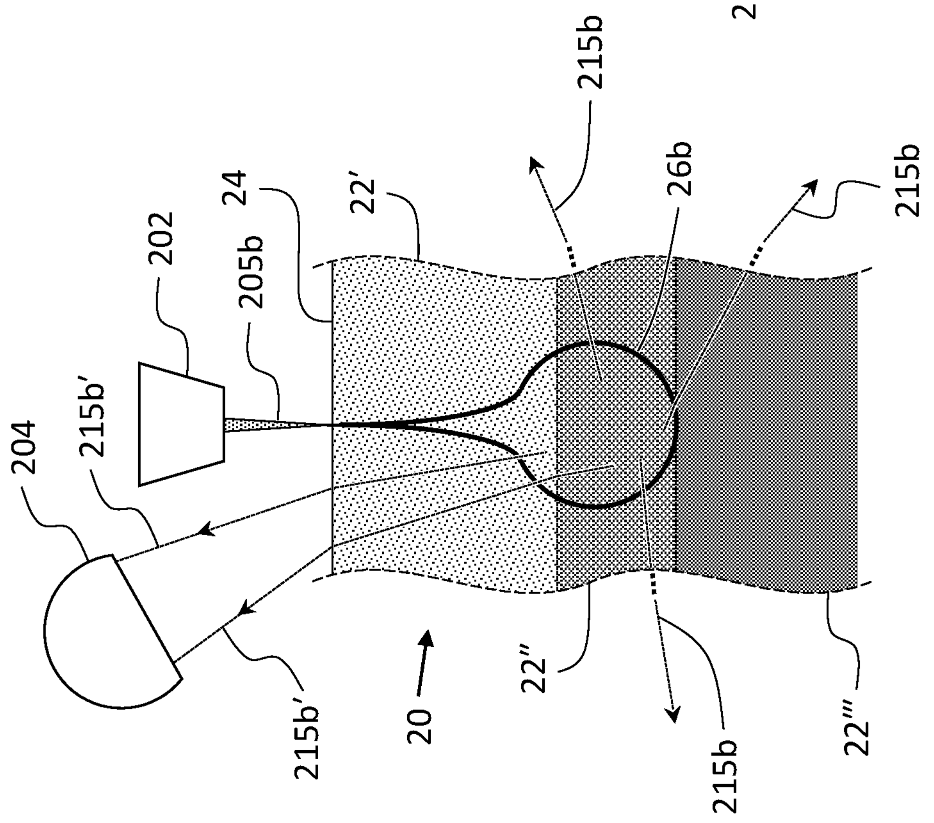

FIG. 2C shows a second e-beam 205*b*, generated by e-beam source 202 and having the second e-beam landing energy $E_2$, incident on specimen 20. Also delineated is second probed region 26*b* (in which about all the characteristic X-ray emitting interactions, induced by second e-beam 205*b*, occur). X-rays may be emitted in all directions, as indicated by X-rays 215*b*. X-rays 215*b'* indicate X-rays (from X-rays 215*b*), which arrive at X-ray detector 204.

FIG. 2D shows a third e-beam 205*c*, generated by e-beam source 202 and having the third e-beam landing energy $E_3$, incident on specimen 20. Also delineated is third probed region 26*c* (in which about all the characteristic X-ray emitting interactions, induced by third e-beam 205*c*, occur). X-rays may be emitted in all directions, as indicated by X-rays 215*c*. X-rays 215*c'* indicate X-rays (from emitted X-rays 215*c*), which arrive at X-ray detector 204.

While in FIGS. 2B-2D layers 22 are depicted as differing from one another in their respective refractive indices (as evinced by the refraction of the X-rays on transition from one layer to another), it is to be understood that method 100 is equally applicable without such differences being present.

For each of the e-beam landing energies (e.g., e-beam landing energies $E_1$, $E_2$, and $E_3$), respective measurement data of emitted X-rays may be obtained by X-ray detector 204, thereby implementing suboperation 110*b*. In particular, for each of the e-beam landing energies, the respective measurement data may include a respective X-ray emission spectrum (which X-ray detector 204 is configured to measure) in a photon energy range, which includes a least one characteristic X-ray line pertaining to a respective target substance of the at least one target substance. The intensity of a characteristic X-ray line corresponding to a target substance is indicative of the average concentration (i.e., particle density) of the target substance in the respective probed region. More specifically, each substance is characterized by a unique set of characteristic X-ray lines (i.e., spectral lines in the characteristic X-rays regime) corresponding to the energy differences between orbitals of elements making up the substance. The greater the concentration of a substance, the greater the measured intensity of each characteristic X-ray line pertaining thereto.

In the next step, (exemplified in suboperation 120*b* of FIG. 1), values $\vec{p}_s$ of structural parameters of the tested specimen are estimated as explained in detail below, based on processing of the values of the key features described above ($\vec{f}_{key}$), and of values of key features derived from reference data ($\vec{f}_n$) (having respective structural features values $\vec{p}_n$) including ground truth (GT) emission profiles of GT specimens (having actually measured, i.e., non-simulated, structural parameters) and simulated emission profiles of simulated specimens (characterized by suitably selected values of structural parameters). The GT reference data are obtained for the $N_1$ GT specimens by actual measurements (as prescribed by operation 110), and the simulated data are obtained for the $N_2$ simulated specimen by computer simulations (simulating operation 110).

In some embodiments, estimating the values $\vec{p}_s$ of structural parameters of the tested specimen comprises treating the values of the key features of the $N_1$ GT specimens differently from the values of the key features of the $N_2$ simulated specimens, such that the estimated values $\vec{p}_s$ are more affected by GT data than by simulated data.

The processing included in suboperation 120*b* may generally be conducted by applying an estimator to the values of key features of the tested specimen $\vec{f}_{key}$ (extracted in suboperation 120*a*). The term "estimator", as used herein, refers to an algorithm used to obtain the values of the structural parameters of the tested specimen based on $\vec{f}_{key}$ and the $\vec{f}_n$. The algorithm may include minimizing a loss function of $\vec{f}_{key}$ and a vector-valued function $\vec{f}_{ext}(\vec{p})$ of the key features, which is extrapolated from the $\vec{f}_n$. According to some embodiments, the loss function may include a term indicative of the distance between $\vec{f}_{key}$ and $\vec{f}_{ext}(\vec{p})$. According to some embodiments, the algorithm may include a k–NN algorithm. According to some embodiments, the algorithm may include minimizing a loss-function following the application of a k–NN algorithm.

The term "extrapolation" is employed herein in an expansive manner and refers, generally, to the derivation of a continuous function from a plurality of data points.

In some embodiments, the extrapolation includes treating different data points differently, as further explained below. In some embodiments, data points derived from GT measurements of the $N_1$ GT specimens are treated differently from data points derived from the $N_2$ simulated specimens. In some embodiments, the different treatment "favors", or is biased towards, data points derived from GT measurements over data points derived from the computer simulations.

In some embodiments, the vectors including values of key features of reference data (GT and/or simulated), and optionally the estimator or the extrapolation, are obtained in advance of measurements of the tested specimen ("offline"). However, it is conceivable that the vectors, the estimator, and/or the extrapolation are obtained following measurement of the tested specimen.

As explained above, the N reference specimens include $0<N_1$ GT specimens and $0<N_2$ simulated specimens, and $N_1+N_2=N$. The vectors of values of key features derived from reference data ($\vec{f}_n$) include: for each $1 \le n \le N_1$, GT data, represented herein by $\vec{f}_{n \le N1}$ (i.e., $$\{\vec{f}_n\}_{n=1}^{N1});$$

and for each $N_1+1 \le n \le N$, simulated data, represented herein by $\vec{f}_{n>N1}$ (i.e., $$\{\vec{f}_n\}_{n=N1+1}^{N}).$$

To each $\vec{f}_n$ corresponds a respective $\vec{p}_n$, characterizing the n-th specimen. Accordingly, if $\vec{f}_n$ includes values of key features of GT measurements, then the respective $\vec{p}_n$ includes GT values of structural parameters; and if $\vec{f}_n$ includes values of key features of computer simulations, then $\vec{f}_n$ is obtained through simulation from the respective $\vec{p}_n$. Additionally, $\vec{\delta}_n$ is the respective deviation for each $\vec{p}_n$ from a reference vector $\vec{p}_0$ (e.g., specifying design intent).

The terms "ground truth (GT)", or "GT", when used herein with respect to specimens, relate to actual, or "real", specimens, as opposed to simulated specimens. When these terms are used with respect to data, measurements, vectors, etc., they relate to data, measurements, vectors, etc. which are derived from the GT specimens (i.e., actual specimens), by actual, i.e., non-simulated, measurements.

GT data may include GT values of structural parameters which are obtained by actual (i.e., non-simulated) measurements, potentially (but not necessarily) involving destruction of the respective specimens. Non-limiting examples for such physical measurements include Time-of-Flight Secondary Ion Mass Spectrometry (ToF-SIMS) and transmission electron microscopy energy-dispersive X-ray (TEM-EDX).

Additionally, GT data may include GT measurements, which refer to actual X-ray measurements such as of X-ray emissions of the GT specimens or background radiation detected during actual experiments.

The term GT data also encompasses data further derived from such GT values or measurements by extraction, manipulation, fitting, etc.

In some embodiments, the GT specimens have values of structural parameters close to a nominal value or a gold standard. For example, may have values of structural parameters similar to, or same as, values of structural parameters of an intended design. In some embodiments, the GT specimens include specimens of a same, or a similar, intended design as the tested specimen.

In some embodiments, the GT specimens include especially prepared samples exhibiting selected variations with respect to the intended design.

Because the methods for obtaining GT data are sometimes destructive and time-consuming, the number of GT specimens ($N_1$) is rather low. In some embodiments, $N_1$ is about 3-10. In some embodiments, $N_1$ is about 3-8, or 3-5.

In some embodiments, characteristic X-rays for each GT specimen are obtained by projecting e-beams on the GT specimen and obtaining measurement data by measuring intensity of X-rays emitted from the GT specimen due to penetration of the e-beam, as described herein for the tested specimen.

In some embodiments, characteristic X-rays for each GT specimen are measured for the GT specimens under the same, or similar, conditions as conditions used for the tested specimen, such as by using the same or similar equipment under the same or similar settings.

Accordingly, in some embodiments, the method further includes a measurement operation for each of the GT specimens, which includes, for each of the e-beam landing energies, performing: a suboperation wherein an e-beam is projected on the GT specimen; and a suboperation wherein measurement data is obtained by measuring intensity of X-rays emitted from the GT specimen due to penetration of the e-beam. In some embodiments, the GT measurement operation is performed prior to operation 110. In some embodiments, the GT measurement operation is performed after operation 110.

In some embodiments, the GT measured X-ray intensities include background radiation intensities similar to those measured for the tested specimen.

In some embodiments, the e-beam landing energies used for projecting on the GT specimens include the e-beam landing energies used for projecting on the tested specimen. In some embodiments, the e-beam landing energies used for projecting on the GT specimens are the same as the e-beam landing energies used for projecting on the tested specimen.

In some embodiments, the method of the invention further includes obtaining structural parameters for the GT specimens. As explained above, obtaining structural parameters may be conducted by various methods, destructive or non-destructive, including as non-limiting examples ToF-SIMS and TEM-EDX.

It is noted that obtaining structural parameters, when conducted by a method which may be destructive to the GT specimen (i.e., causing any change to the specimen), must be conducted after the GT measurement operation.

In some embodiments, values of key features are extracted from the measurement data for the GT specimens, as described herein for the tested specimen. In some embodiments, the key features are the same key features used for the tested specimen. In some embodiments, the extracting of values of key features from the measurement data for the GT specimens is conducted by the same methods used for extracting values of key features from the measurement data for the tested specimen.

Accordingly, in some embodiments, the method further includes a data analysis operation for each of the GT specimens, wherein values of key features, specified by a vector $\vec{f}_{n\leq N_1}$, are extracted from the GT measurement data. In some embodiments, the GT data analysis operation is performed prior to operation 120*a*. In some embodiments, the GT data analysis operation is performed after operation 120*a*.

According to some embodiments, the $N_2$ simulated specimens may be selected so as to reflect expected variations (e.g., due to manufacturing imperfections) in values of the one or more structural parameters between specimens (of the same intended design). In some embodiments, the values of structural parameters of simulated specimens $\vec{p}_n$ (for $N_1+1\leq n\leq N$) may be selected to "sample" a selected hypervolume centered about $\vec{p}_0$ in a $K_P$ dimensional vector space defined by the one or more structural parameters. $\vec{p}_0$ specifies nominal values of the one or more structural parameters, and $K_P$ is the number of the structural parameters. In some embodiments, $K_P$ is about 2-6, or about 3-5 structural parameters. The size and boundaries of the selected hypervolume may be selected so as to encompass the expected variation of the one or more structural parameters. According to some embodiments, the number of simulated specimens $N_2$ is greater than $2K_P$ (or at least strictly greater than $K_P$). In some embodiments, the number of simulated specimens $N_2$ is about $3K_P$-$7K_P$ or about $5K_P$-$7K_P$. As a non-limiting example, according to some embodiments, the $\vec{p}_n$ may be selected such that, in terms of deviations from nominal values $\vec{\delta}_n=\vec{p}_n-\vec{p}_0$, the $\vec{\delta}_n$ include each vector in a set of $2K_P$ vectors $$\{\vec{d}_k, -\vec{d}_k\}_{k=1}^{K_P}.$$

For each $1\leq k\leq K_P$, $\vec{d}_k$ is about equal to $\sigma_k\imath_k$. $\sigma_k$ is the expected standard deviation of the k-th structural parameter, and $\imath_k$ is a unit vector pointing along the k-th axis of the $K_P$ dimensional vector space defined by the $K_P$ structural parameters.

In some embodiments, the $\vec{p}_n$ relating to the GT specimens are within the selected hypervolume. In some embodiments, at least one of the $\vec{p}_n$ relating to the GT specimens is within the selected hypervolume. In some embodiments, at least one of the $\vec{p}_n$ of the GT specimens is not within the selected hypervolume.

In some embodiments, selecting the $\vec{p}_n$ relating to simulated specimens (for $N_1+1\leq n\leq N$) takes into account the values of structural parameters $\vec{p}_n$ related to the GT specimens (for $1\leq n\leq N_1$). For example, in some embodiments, the simulated specimens are selected to have values covering areas of the hypervolume which are less well covered by the GT data.

It is noted that in embodiments wherein the one or more structural parameters are constituted by a single structural parameter, $\vec{p}_s$ and each of the $\vec{p}_n$ are a one-dimensional vectors (i.e., scalars). Non-limiting examples include embodiments wherein only the thickness of a single layer, or the overall mass density of a single target substance, is to be determined.

The values of the $\vec{f}_{n>N1}$ for the simulated specimens may be obtained through computer simulation. In an analogous manner to $\vec{f}_{key}$, each of the $\vec{f}_{n>N1}$ is, includes, or is obtained from (i.e., is a function of) respective simulated (instead of measured) spectral parameters characterizing the characteristic X-ray lines pertaining to the n-th simulated specimen. In particular, the $\vec{f}_{n>N1}$ and $\vec{f}_{key}$ may share the same functional form (i.e., the same dependence on spectral parameters, such as the energy signature and, optionally, the background radiation). More precisely, in order to obtain the $\vec{f}_{n>N1}$, the striking of e-beams at each of the at least one landing energy on each of the $N_2$ (simulated) specimens, penetration thereof thereinto, and the resulting emission of X-rays, is simulated. Specifically, the computer simulation may simulate each of $N_2$ implementations of measurement operation 110 with respect to each of the $N_2$ simulated specimens. For each $N_1+1\leq n\leq N$, the n-th simulated specimen is characterized by respective values $\vec{p}_n$ of the one or more structural parameters. The computer simulation is configured to output the values of the key features corresponding to the simulated specimens, that is, $\vec{f}_{n>N1}$ for the n-th simulated specimen (i.e., characterized by $\vec{p}_n$).

According to some embodiments, method 100 may further include an operation of deriving the $\vec{f}_{n>N1}$ (i.e., the set $$\{\vec{f}_n\}_{n=N1+1}^{N}).$$

For each $N_1+1\leq n\leq N$, $\vec{f}_{n>N1}$ may be derived through computer simulation, which simulates for each landing energy: (i) the impinging of the respective simulated specimen, characterized by respective values $\vec{p}_n$ of the one or more structural parameters, by an e-beam (at the given landing energy), (ii) the penetration of the e-beam into the respective simulated specimen and the travel thereof therein, (iii) the resulting emission of X-rays from the respective simulated specimen, and, optionally, (iv) measurement of the emitted X-rays. In some embodiments, the operation of deriving $\vec{f}_{n>N1}$ precedes operation 110. In some embodiments, the operation of deriving $\vec{f}_{n>N1}$ is performed after operation 110. It is noted that any specific implementation, such as a model or an algorithm used in the present invention, may be applied to the complete set of vectors $\vec{f}_n$, applied separately to the GT reference vectors $\vec{f}_{n\leq N1}$ and to the simulated vectors $\vec{f}_{n>N1}$, or applied to a partial set of the vectors $\vec{f}_n$.

According to some embodiments, and as expanded on below in the description of FIG. 3, in suboperation 120*b*, the minimum distance between $\vec{f}_{key}$ and a vector-valued function $\vec{f}_{ext}(\vec{p})$ (extrapolated from the $\vec{f}_n$) may be computed, thereby obtaining $\vec{p}_s$. Each of the components of the vector-valued function quantifies the dependence of a respective (extrapolated) key feature on (the values of) the one or more structural parameters. The one or more structural parameters are parameterized by $\vec{p}$, wherein $\vec{p}$ is a vector of free parameters (i.e., variables corresponding to the structural parameters, respectively). As detailed below, according to some embodiments, the minimum distance may be obtained by minimizing over $\vec{p}$ with each of the components of $\vec{p}$ being varied over a respective continuous range of values.

According to some embodiments, and as described in detail below in the description of FIG. 3, $\vec{p}_s$ minimizes a loss function of $\vec{f}_{key}$ and a vector valued function $\vec{f}_{ext}(\vec{p})$ of the key features that is extrapolated from $$\{\vec{f}_n\}_{n=1}^{N}.$$

According to some embodiments, apart from a first term which depends on both $\vec{f}_{key}$ and $\vec{f}_{ext}(\vec{p})$, the loss function may additionally include a regularizing term(s), e.g., in order to stabilize the solution or as a constraint(s) that reflects some prior knowledge about the one or more structural parameters. According to some embodiments, the first term corresponds to a mathematical distance between $\vec{f}_{key}$ and $\vec{f}_{ext}(\vec{p})$. According to some embodiments, standard local and/or global optimization tools may be used to minimize the loss function and thereby estimate $\vec{p}_s$. Alternatively, according to some embodiments wherein the optimization problem, defined by the minimization over the loss function, admits a known analytical solution, $\vec{p}_s$ may be computed directly from the (function defining the) analytical solution.

According to some embodiments, and as expanded on below, $\vec{p}_s$ is estimated by computing distances from $\vec{f}_{key}$ to the $\vec{f}_n$.

Alternatively, according to some embodiments, $\vec{p}_s$ may be obtained by applying a k-nearest neighbor (k–NN) regression algorithm (k<N) to $\vec{f}_{key}$ with respect to the $\vec{f}_n$. According to some embodiments, the $\vec{p}_n$ include $\vec{p}_0$ (e.g., a vector specifying nominal values of the one or more structural parameters, which may correspond to structural parameters of a GT specimen or a simulated specimen). Accordingly, the $\vec{f}_n$ include a vector $\vec{f}_0$, which may be based on actually measured GT data, or on simulated data obtained by the computer simulation when implemented with respect to a simulated specimen characterized by the nominal values (i.e., $\vec{p}_0$). It is noted that the k–NN regression algorithm may be weighted or non-weighted. That is, $\vec{p}_s$ may be taken to equal the average or the weighted average of the $\vec{p}_n$ corresponding to the k closest $\vec{f}_n$.

In some embodiments, the k–NN regression algorithm is differentially weighted between GT values and simulated values, so that it is biased towards data derived from the GT specimens.

This may be done at the selection stage of the k vectors by weighing each of the $N_1$ distances $\|\vec{f}_{n\leq N1}-\vec{f}_{key}\|$ by a positive factor (or a respective positive factor) smaller than 1, thereby "bringing" the $\vec{f}_{n\leq N1}$ closer to $\vec{f}_{key}$, and/or weighing each of the $N_2$ distances $\|\vec{f}_{n>N1}-\vec{f}_{key}\|$ by a positive factor (or a respective positive factor) greater than 1, thereby distancing the $\vec{f}_{n>N1}$ from $\vec{f}_{key}$. Additionally or alternatively, after the selection of k of the $\vec{f}_n$, in calculating $\vec{p}_s$, the $\vec{p}_{n\leq N1}$ may be additionally weighted so as to be assigned a greater weight.

For example, wherein the k–NN algorithm is weighted after the selection stage, each of the simulated values is assigned a weight, such as, of 1/d, when d is the respective distance from $\vec{f}_{key}$ (or from $\vec{f}_0$), and each of the GT values is assigned a higher weight of, such as, 2/d, or 3/d, etc.

In some embodiments, the weights are determined by multiple iterations of the k–NN algorithm, each time leaving a different GT specimen out of the computation and using the left out GT specimen as the tested specimen, trying to predict the values of the structural parameters of the left out GT specimen. The weights which were used for the closest prediction are selected for the estimator.

In some embodiments, the k–NN algorithm is applied to the complete set of reference data, including GT and simulated data. In some embodiments, the k–NN algorithm is applied separately to the GT data and to the simulated data. In some embodiments, the k–NN algorithm is applied only to a partial set of reference data.

Alternatively, $\vec{p}_s$ may be taken to equal the median of the $\vec{p}_n$ corresponding to the k $\vec{f}_n$ closest to $\vec{f}_{key}$. Generally, i.e., when the one or more structural parameters include two or more structural parameters, the term "median" is to be understood as referring to a multi-variate extension of the (one-dimensional notion of the) median, such as the marginal median or the geometric median. More generally, $\vec{p}_s$ may be substantially any function of the $\vec{p}_n$ corresponding to the k $\vec{f}_n$ closest to $\vec{f}_{key}$. In some embodiments, the median is a weighted median, assigning higher weights to GT data (as if the set includes more GT data points than it actually does) than to simulated data.

Still, according to some other embodiments, $\vec{p}_s$ is estimated as the output of a neural network. The neural network is configured to receive as input a vector of key features (i.e., $\vec{f}_{key}$) and to output $\vec{p}_s$. The neural network is trained using a training set including N pairs of vectors, such that, for each $1 \leq n \leq N$, $\vec{f}_n$ serves as the (training) input and $\vec{p}_n$ as the corresponding (training) output. In some embodiments, the neural network algorithm is configured to weigh GT data higher than simulated data, e.g., by using nonuniform weights in a loss function.

Figure 3:
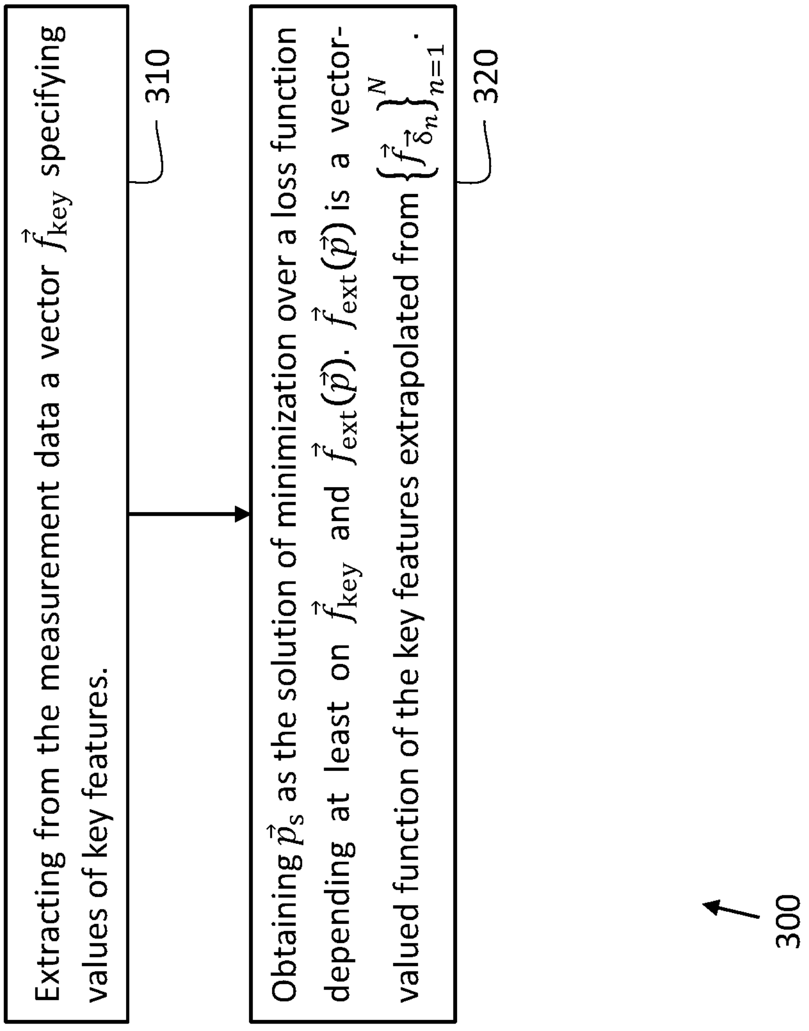
FIG. 3 presents a flowchart of a measurement data analysis operation of the method of FIG. 1, according to some specific embodiments thereof.

FIG. 3 presents a flowchart of a measurement data analysis operation 300, which corresponds to specific embodiments of measurement data analysis operation 120 of method 100. Measurement data analysis operation 300 includes:

A suboperation 310, wherein key features, specified by a vector $\vec{f}_{key}$, are extracted from the measurement data.

A suboperation 320, wherein $\vec{p}_s$ is obtained as the (numerical or analytical) solution of minimization over a loss function depending on at least $\vec{f}_{key}$ and $\vec{f}_{ext}(\vec{p})$. (That is, $\vec{p}_s$ minimizes the loss function.) $\vec{f}_{ext}(\vec{p})$ is a vector-valued function of the key features obtained through extrapolation from $$\{\vec{f}_n\}_{n=1}^{N}.$$

Suboperations 310 and 320 correspond to specific embodiments of suboperations 120*a* and 120*b*, respectively, of method 100.

Each of the components of $\vec{f}_{ext}(\vec{p})$ is a function quantifying the dependence, as prescribed by a model, of the corresponding key feature on the values $\vec{p}$ of the one or more structural parameters. Thus, for example, $$f_{ext}^{(j)}(\vec{p}),$$

the j-th component of $\vec{f}_{ext}(\vec{p})$, is a function quantifying the dependence, per the model, of the j-th key feature (e.g., the j-th component of the energy signature) on p.

According to some embodiments, in suboperation 320, $$\vec{p}_s = \underset{\vec{p}}{\operatorname{argmin}}\, D\left(\vec{f}_{key}, \vec{f}_{text}(\vec{p})\right).$$

$D(\vec{v}_1, \vec{v}_2)$ denotes a mathematical distance (which may or not be a norm) between a pair of vectors $\vec{v}_1$ and $\vec{v}_2$ (so that $D(\vec{f}_{key}, \vec{f}_{ext}(\vec{p}))$ is a (mathematical) distance between $\vec{f}_{key}$ and $\vec{f}_{ext}(\vec{p})$). Non-limiting examples of distances include the $L^1$ norm and the $L^2$ norm. (It is noted that in embodiments wherein the norm is $L^2$, and $\vec{f}_{ext}(\vec{p})$ is linear in $\vec{p}$, the optimization problem admits an analytical solution.) According to some such embodiments, $$\vec{p}_s = \underset{\vec{p}}{\operatorname{argmin}} \left\| \vec{f}_{key}, \vec{f}_{ext}(\vec{p}) \right\|.$$

The double vertical bars denote a vector norm (e.g., a Euclidian norm: $\|\vec{f}_{key} - \vec{f}_{ext}(\vec{p})\|_2 = \sqrt{(\vec{f}_{key} - \vec{f}_{ext}(\vec{p}'))}$). More generally, and as elaborated on below, $\vec{p}_s$ may be estimated via $$\vec{p}_s = \underset{\vec{p}}{\operatorname{argmin}}\left( \min_{M_1, M_2} D\left(M_1 \vec{f}_{key}, M_2 \vec{f}_{ext}(\vec{p})\right)\right),$$

wherein $M_1$ and $M_2$ are matrices having suitably selected properties as specified below. In particular, each of $M_1$ and $M_2$ may be a positive definite matrix—optionally, diagonal—with a respective minimum eigenvalue which is greater than a respective prespecified (positive) threshold.

According to some embodiments, a regularizing term(s) may be added to the norm $\|\vec{f}_{key} - \vec{f}_{ext}(\vec{p})\|$ (or, more generally, $\|M_1 \vec{f}_{key} - M_2 \vec{f}_{ext}(\vec{p})\|$, $D(M_1 \vec{f}_{key}, M_2 \vec{f}_{ext}(\vec{p}))$, or a first term—depending on $\vec{f}_{key}$ and $\vec{f}_{ext}(\vec{p})$—of a loss function) to stabilize the solution or as a constraint(s), which reflects some prior knowledge about the one or more structural parameters.

According to some embodiments, the extrapolation is to a linear function. That is, $\vec{f}_{ext}(\vec{p}) = \vec{f}_{ext}(\vec{p}_0 + \vec{\delta}) = \vec{f}_0 + \Delta\vec{\delta} = \vec{f}_0 + A(\vec{p} - \vec{p}_0)$, wherein $\vec{f}_0$ is a vector of values of the key features corresponding to $\vec{p}_0$. A is a $K_f \times K_p$ matrix. $K_f$ is the number of key features, i.e., the dimensionality of $\vec{f}_{ext}(\vec{p}_0 + \vec{\delta})$ (and of $\vec{f}_0$ and each of the $\vec{f}_n$). $K_p$ is the dimensionality of $\vec{p}_0$ (and the $\vec{p}_n$), that is, the number of the one or more structural parameters of the tested specimen (and each of the GT and the simulated specimens), which are to be estimated. $\vec{f}_0$ specifies values of key features corresponding to a nominal specimen (i.e., characterized by the nominal values $\vec{p}_0$).

According to some embodiments, $\vec{f}_0$ includes GT values obtained by actual measurements, in the same way done for the tested specimen or for the GT specimens, described above.

According to some embodiments, $\vec{f}_0$ includes simulated values obtained in the same way the simulated $\vec{f}_n$ are obtained. That is, through a computer simulation simulating the striking and penetration into a specimen, characterized by $\vec{p}_0$, of e-beams at each of the at least one landing energy, and the consequent emission of X-rays.

According to some embodiments, $$A = \underset{B}{\operatorname{argmin}} \left\| \begin{pmatrix} \left(\vec{f}_1 - \vec{f}_0 - B\vec{\delta}_1\right)^T \\ \left(\vec{f}_2 - \vec{f}_0 - B\vec{\delta}_2\right)^T \\ \vdots \\ \left(\vec{f}_N - \vec{f}_0 - B\vec{\delta}_N\right)^T \end{pmatrix} \right\|$$

For each $1 \leq n \leq N$, $\vec{\delta}_n = \vec{p}_n - \vec{p}_0$. B is a $K_f \times K_p$ matrix. The double vertical bars denote a matrix norm (e.g., the Frobenius norm). Optionally, according to some embodiments, a regularizing term(s) may be added to the matrix norm, in which case the minimization is to be understood as being over the sum of the matrix norm and the regularizing term(s).

Alternatively, according to some embodiments, similarly to the matrix A, $\vec{f}_0$ is determined through optimization. In particular, according to some such embodiments, both $\vec{f}_0$ and the matrix A are obtained as the solution of $$\underset{\vec{g},B}{\operatorname{argmin}}\left\|\begin{pmatrix}(\vec{f}_1-\vec{g}-B\vec{\delta}_1)^T\\(\vec{f}_2-\vec{g}-B\vec{\delta}_2)^T\\\vdots\\(\vec{f}_N-\vec{g}-B\vec{\delta}_N)^T\end{pmatrix}\right\|$$

with the double vertical bars denoting a matrix norm (e.g., the Frobenius norm). Optionally, according to some embodiments, a regularizing term(s) may be added to the matrix norm, in which case the minimization is to be understood as being over the sum of the matrix norm and the regularizing term(s).

In some embodiments, the $\vec{f}_n$ in the matrix are treated differently depending on whether they are derived from GT data ($1\le n\le N_1$) or from simulated data ($N_1+1\le n\le N$), such that the GT data have more influence on the resulting A. Some non-limiting exemplary embodiments are provided below.

In some embodiments, $$\vec{f}_{ext}=\underset{f\in\mathcal{F}}{\operatorname{argmin}}\sum_{i=1}^{N}D_i\left(\vec{f}(\vec{p}_i),\vec{f}_i\right),$$

where $\mathcal{F}$ is a predefined class of functions and $D_i$: $\mathbb{R}^{K_f}\times\mathbb{R}^{K_f}\to\mathbb{R}^+$, where Kris the number of key features, i.e., the dimensionality of f, is a general loss function that may or may not depend on i. In some embodiments, all data (e.g., both simulated and GT data) are treated equally by $D_i$ being the same for all i. However, in some embodiments, GT data are treated differently from simulated data, by using a different $D_i$ for each group, i.e., $D_i=D_1$ for $i\le N_1$ and $D_i=D_2$ for $i>N_1$. For using "different weights" for the GT and for the simulated specimens, $D_2$ may be different from $D_1$, such as a multiple of $D_1$, e.g., $D_2=D$ and $D_1=\alpha\cdot D$ for some loss function D and constant scalar $\alpha$. In some embodiments, $\alpha>1$, resulting in a "higher weight", or a bias, towards data derived from GT specimens over data derived from simulated specimens. It is appreciated that different $D_i$s may be assigned to different data elements based on other criteria.

Non-limiting examples for D include the $L^1$ norm and the $L^2$ norm, discussed above with reference to suboperation 320, and $$D(\vec{v}_1,\vec{v}_2)=\min_{M_1,M_2}D(M_1\vec{v}_1,M_2\vec{v}_2),$$

also discussed above, wherein $\vec{v}_1$ and $\vec{v}_2$ are a pair of vectors (so that $D(\vec{v}_1,\vec{v}_2)$ is a (mathematical) distance between $\vec{v}_1$ and $\vec{v}_2$, and $M_1$ and $M_2$ are matrices having suitably selected properties as specified in the above discussion of suboperation 320. As above, a different $D_i$ may be used for different specimens, or different groups of specimens, such as for the GT specimens and for the simulated specimens, as follows: $D_i=D_1$ for $i\le N_1$ and $D_i=D_2$ for $i>N_1$. As explained above, using $D_1>D_2$, e.g., by using $D_2=D$ and $D_1=\alpha\cdot D$ when $\alpha>1$, provides a bias towards GT data.

A further non-limiting example for $\mathcal{F}$ is a function composed of a linear function ("affine function", which may include a constant term). Here $\mathcal{F}$ is the class of functions of the form $f(\vec{v})=A\vec{v}+b$ (or, e.g., $f(\vec{v})=A\vec{v}+\vec{f}_0$). In this case the optimization becomes $$A,b=\underset{B,g}{\operatorname{argmin}}\sum_{i=1}^{N}d_i\left(B\vec{p}_i+g,\vec{f}_i\right)$$

and the resulting $\vec{f}_{ext}$ $\vec{f}_{ext}(\vec{p})=A\vec{p}+b$.

According to some such embodiments, similar to embodiments mentioned above with respect to suboperation 320, the function is a linear function with Frobenius/L2 norm, where $D_i(\vec{v}_1,\vec{v}_2)=\alpha_i\|_1-\vec{v}_2\|^2$. Accordingly, the matrix A equals $$\underset{B}{\operatorname{argmin}}\sum_{i=1}^{N}\alpha_i\left\|\vec{f}_i-\vec{f}_0-B\vec{\delta}_i\right\|^2,$$

or both $\vec{f}_0$ and the matrix A are obtained as the solution of $$\underset{\vec{g},B}{\operatorname{argmin}}\sum_{i=1}^{N}\alpha_i\left\|\vec{f}_i-\vec{g}-B\vec{\delta}_i\right\|^2.$$

As noted above for using a different $D_i$ for different groups of data, here at may be the same for all data (resulting in equal treatment for all data), or different for different data. For example, $\alpha_i$ may be larger for GT specimens ($i\le N_1$), than for simulated specimens ($i>N_1$), resulting in a bias towards GT specimens. Optionally, according to some embodiments, a regularizing term(s) may be added to the matrix norm, in which case the minimization is to be understood as being over the sum of the matrix norm and the regularizing term(s).

According to some embodiments, the extrapolation may be to a non-linear function of $\vec{\delta}$. As a non-limiting example, according to some such embodiments, $\vec{f}_{ext}(\vec{p}_0+\vec{\delta})$ is a square function of $\vec{\delta}$. That is, in such embodiments, for each $1\le c\le K_f$, the c-th component of $\vec{f}_{ext}(\vec{p}_0+\vec{\delta})$ will include (in addition to a linear contribution and a constant) a square contribution given by $$\sum_{b=1}^{K_p}\sum_{a=1}^{K_p}T_{ab}^{(c)}\delta_a\delta_b,$$

wherein $$T_{ab}^{(c)}$$

denotes the (a, b)-th component of a $K_p\times K_p$ matrix $T^{(c)}$.

Optimization problems specified throughout the application may be solved using standard local and/or global optimization algorithms, such as gradient descent or quasi-Newton. According to some embodiments, wherein a specified optimization problem admits a known analytical solution, the quantity (e.g., $\vec{p}_s$, the matrix A, $\vec{f}_0$) sought to be optimized may be computed directly from the (function defining the) analytical solution. As a non-limiting example, in embodiments wherein $\vec{f}_{ext}(\vec{p})$ is linear in $\vec{p}$ (that is, $\vec{f}_{ext}(\vec{p})=\tilde{A}\vec{p}+\vec{b}$ with $\tilde{A}$ being a matrix) and the norm is $L^2$, the optimization problem assumes the form $$\underset{\vec{p}}{\operatorname{argmin}}\left\|\tilde{A}\vec{p}+\vec{b}-\vec{f}_{key}\right\|,$$

so that $\vec{p}_s=\tilde{M}(\vec{f}_{key}-\vec{b})$, wherein the matrix $\tilde{M}$ is Moore-Penrose inverse of $\tilde{A}$. As yet another example, in embodiments wherein $$\underset{B}{\operatorname{argmin}}\left\|\begin{pmatrix}(\vec{f}_1-\vec{f}_0-B\vec{\delta}_1)^T\\(\vec{f}_2-\vec{f}_0-B\vec{\delta}_2)^T\\\vdots\\(\vec{f}_N-\vec{f}_0-B\vec{\delta}_N)^T\end{pmatrix}\right\|$$

admits a (known) analytical solution, as is the case, for instance, when the matrix norm is the Frobenius norm, A may be obtained by plugging the $\vec{f}_n$ and the $\vec{\delta}_n$ into the (function defining the) analytical solution. More precisely, the analytical solution is given by $A=(F-F_0)Q$, wherein Q is the Moore-Penrose inverse of a matrix D whose columns are constituted by the on, Fis a matrix whose columns are constituted by the $\vec{f}_n$, and $F_0$ is matrix whose columns are each constituted by $\vec{f}_0$. Finally, in embodiments wherein $$\underset{\vec{g},B}{\operatorname{argmin}}\left\|\begin{pmatrix}(\vec{f}_1-\vec{g}-B\vec{\delta}_1)^T\\(\vec{f}_2-\vec{g}-B\vec{\delta}_2)^T\\\vdots\\(\vec{f}_N-\vec{g}-B\vec{\delta}_N)^T\end{pmatrix}\right\|$$

admits a (known) analytical solution, as is the case, for example, when the matrix norm is the Frobenius norm, $\vec{f}_0$ and A may be obtained by plugging the $\vec{f}_n$ and the $\vec{\delta}_n$ into the (function defining the) analytical solution. Through suitable manipulation, the analytical solution may be obtained in essentially the same manner as in the case wherein only A is to be determined (i.e., when $\vec{f}_0$ is given).

Optionally, according to some embodiments, measurement data analysis operation 300 may further include, prior to suboperation 320, an (optional) suboperation (not specified in FIG. 3) of obtaining $$\{\vec{f}_n\}_{n=1}^{N}$$

by subjecting $\vec{f}_{key}$ to an (k=N)-NN classifier with respect to a set of N'>N vectors of key features $$\{\vec{f}_n\}_{i=1}^{N'}$$

corresponding to N'>N additional reference specimens, which include the $\vec{f}_n$ (optionally, relabeled). In some embodiments, the additional N'−N vectors (i.e., beyond $$\{\vec{f}_n\}_{n=1}^{N}$$

include vectors corresponding to additional simulated specimens, which are obtained by applying the computer simulation with respect to the additional simulated specimens. The full set of $N'\vec{p}_i$ may be selected as described above in the description of method 100. In some embodiments, the additional N'−N vectors include vectors corresponding to additional GT specimens, which are obtained as described above for $\vec{f}_{n\leq N1}$. In some embodiments, the additional N'−N vectors include vectors corresponding to additional GT specimens and to additional simulated specimens.

In some embodiments, measurement data analysis operation 300 may further include, prior to suboperation 320, an (optional) suboperation (not specified in FIG. 3) of obtaining $$\{\vec{f}_n\}_{n=N1+1}^{N}$$

by subjecting $\vec{f}_{key}$ to the classifier is $(k=N_2)$-NN with respect to a set of $N_2'>N_2$ vectors of simulated key features $$s\{\vec{f}_i\}_{i=N1+1}^{N'}\vec{f}$$

including the $\vec{f}_{n>N1}$ vectors of simulated key features (thereby obtaining the set $$\{\vec{f}_n\}_{n=1}^{N}).$$

Referring again to method 100, according to some embodiments, in suboperation 120*a* (and therefore also suboperation 310), in order to derive $\vec{f}_{key}$, onto each of the X-ray emission spectra (obtained for each of the e-beams projected in measurement operation 110) a respective curve is fitted. This is illustrated by way of example in FIGS. 4A-4E, according to some embodiments, in the case wherein $\vec{f}_{key}$ is given by the energy signature associated with a single target substance and a single spectral line (i.e., single characteristic X-ray line). A more general case, wherein the energy signature is associated with a plurality of target substances, and/or for at least some of the target substances a plurality of spectral lines thereof is taken into account, is described later on.

In some embodiments, a respective curve is fitted onto each of the X-ray emission spectra obtained for the GT specimens for deriving $\vec{f}_{n\leq N1}$, by the same methods described herein for deriving $\vec{f}_{key}$.

Figure 4A:
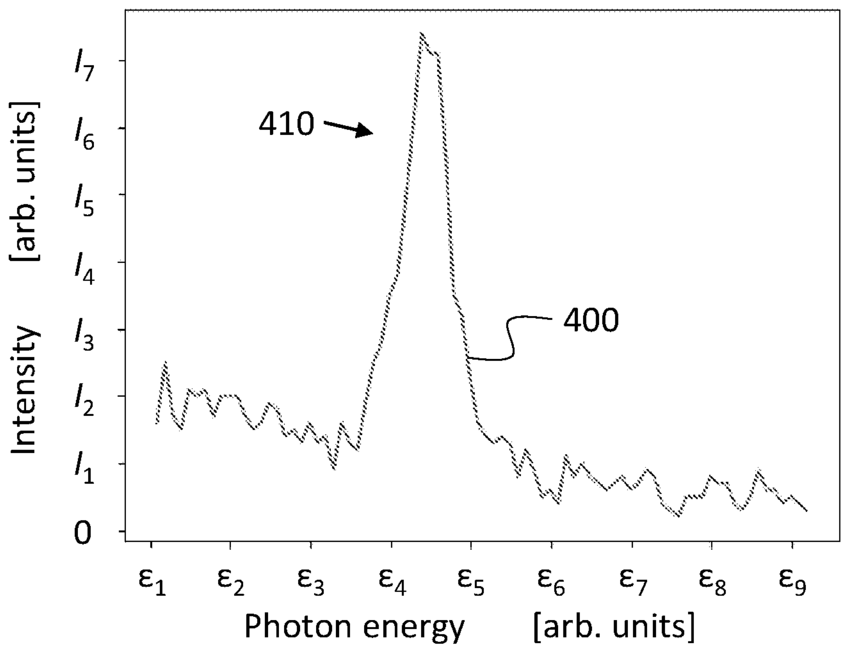
FIG. 4A presents an X-ray emission spectrum of a specimen, which was obtained by implementing a measurement operation of the method of FIG. 1, according to some embodiments thereof.
Figure 4B:
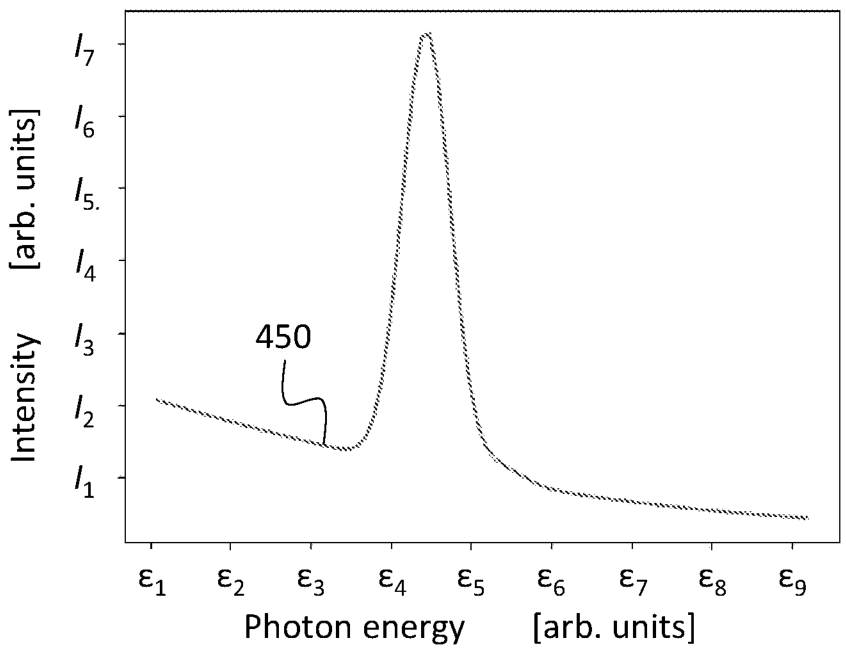
FIG. 4B presents an optimized curve which was fitted onto the X-ray emission spectrum of FIG. 4A in accordance with specific embodiments of a measurement data analysis operation of the method of FIG. 1.

Referring to FIG. 4A, FIG. 4A depicts a measured (X-ray emission) spectrum 400, which was obtained by implementing measurement operation 110 with respect to a tested specimen (e.g., specimen 20). As is also the case in each of FIGS. 4B-4E, the horizontal axis corresponds to the photon energy $\varepsilon$ (or equivalently the frequency) of the emitted X-rays and the vertical axis to the intensity I of the emitted X-rays. The graduations on each of the horizontal and vertical axes are linearly spaced-apart with $\varepsilon_i<\varepsilon_{i+1}$ and $I_i<I_{i+1}$. A peak 410 of measured spectrum 400 is substantially centered about a characteristic X-ray line of a target substance, which is included in the tested specimen, and whose energy signature is to be obtained. FIG. 4B depicts an optimized curve 450, which was fitted onto measured spectrum 400. FIG. 4C depicts optimized curve 450 superimposed on measured spectrum 400.

According to some embodiments, the fitting onto measured spectrum 400 involves optimizing over values of one or more adjustable parameters of a curve (also referred to as the "free curve"), thereby obtaining optimized curve 450. The values of the one or more adjustable parameters are fixed by minimizing (over the one or more adjustable parameters) a distance between the free curve and the measured spectrum.

The one or more adjustable parameters may include a (first) adjustable parameter whose value is indicative of an intensity of the emitted X-rays about the characteristic X-ray line of the target substance. According to some such embodiments, the adjustable parameter is a multiplicative coefficient of a normalized cap-shaped function (e.g., a normalized gaussian), which may be centered the characteristic X-ray line. According to some embodiments, the one or more adjustable parameters include a plurality of adjustable parameters, which may include—in addition to the first adjustable parameter—an additive bias parameter, at least one parameter governing a shape of the cap-shaped function (e.g., the width of a normalized gaussian), and/or a (characteristic X-ray) line shift parameter governing the location of the center of the cap-shaped function.

More generally, according to some embodiments, the free curve may be a sum of at least two adjustable functions: an adjustable cap-shaped function, which may be centered about the characteristic X-ray line, and an adjustable second function quantifying the (continuous) spectrum of the bremsstrahlung (i.e., background radiation) component of the respective measured X-ray emission spectrum (e.g., the background radiation in the vicinity of the characteristic X-ray line). As a non-limiting example, the at least one landing energy includes $N_E$ e-beam landing energies $$\{E_i\}_{i=1}^{N_E},$$

so that $N_E$ X-ray emission spectra are measured:

$$\{s_i(\varepsilon)\}_{i=1}^{N_E}.$$

Here ε denotes a photon energy of the emitted X-rays and $s_i(\varepsilon)$—the i-th measured X-ray emission spectrum—is the measured X-ray emission spectrum induced by projecting an e-beam at the landing energy $E_i$. According to some embodiments, a set of $N_E$ free curves $$\{c_i(\varepsilon)\}_{i=1}^{N_E}$$

may be fitted onto the set of measured spectra $$\{s_i(\varepsilon)\}_{i=1}^{N_E}.$$

According to some embodiments, for each $1 \leq i \leq N_E$, $c_i(\varepsilon)=G_i(\varepsilon)+b_i(\varepsilon)$, wherein $G_i(\varepsilon)$ is the adjustable cap-shaped function and $b_i(\varepsilon)$ is the adjustable second function. $G_i(\varepsilon)=a_i \cdot g_i(\varepsilon)$, wherein $g_i(\varepsilon)$ is a normalized cap-shaped function and $a_i$ is a multiplicative coefficient. According to some embodiments, $g_i(\varepsilon)$ may be a (normalized) gaussian, in which case the width and, optionally, center of $g_i(\varepsilon)$ may be adjustable parameters (over which the optimization is carried out). According to some alternative embodiments, $g_i(\varepsilon)$ may be a (normalized) gamma distribution or generalized gaussian distribution. According to some embodiments, $b_i(\varepsilon)$ may be a polynomial (e.g., a first order polynomial or a second order polynomial) whose coefficients are adjustable. Alternatively, according to some embodiments, $b_i(\varepsilon)$ may be determined from Kramer's law.

Since $g_i(\varepsilon)$ is normalized, $a_i$ substantially equals the intensity of the X-rays (or equivalently the number of photons) emitted due to transitions—which correspond to the characteristic X-ray line of the target substance—a and collected (detected) by the X-ray measurement module.

Denoting by $$\{g_{i,J}\}_{j=1}^{j_{max}} = \{b_{i,k}\}_{k=0}^{k_{max}}$$

the adjustable parameters of $g_i(\varepsilon)$ and $b_i(\varepsilon)$, respectively, for each $1 \leq i \leq N_E$, the optimized values $\hat{a}_i$, $$\{\hat{g}_{i,j}\}_{j=1}^{j_{max}} \text{ and } \{\hat{b}_{i,k}\}_{k=0}^{k_{max}}$$

of the adjustable parameters may be obtained by minimizing $D(c_i(\varepsilon), s_i(\varepsilon))$ over $a_i$, $$\{g_{i,j}\}_{j=1}^{j_{max}},$$

and $$\{b_{i,k}\}_{k=0}^{k_{max}} \cdot D(c_i(\varepsilon), s_i(\varepsilon))$$

is a distance between $c_i(\varepsilon)$ and $s_i(\varepsilon)$. More generally, according to some embodiments, the optimized values may be obtained by minimizing over a loss function depending at least on $c_i(\varepsilon)$ and $s_i(\varepsilon)$. As a non-limiting example, according to some embodiments, wherein $g_i(\varepsilon)$ is gaussian and $b_i(\varepsilon)$ is a second order polynomial:

$$(i)\{g_{i,j}\}_{j=1}^{2} = \{g_{i,1}, g_{i,2}\}$$

with $g_{i,1}$ and $g_{i,2}$ parameterizing the width and center of the gaussian; and $$\{b_{i,k}\}_{k=0}^{2} = \{b_{i,0}, b_{i,1}, b_{i,2}\} \quad \text{(ii)}$$

$\{b_{i,0}, b_{i,1}, b_{i,2}\}$ with $b_{i,0}$, $b_{i,1}$, and $b_{i,2}$ being the zeroth order, first order, and second order coefficients of the polynomial. In particular, $$\hat{a}_i = \text{argmin}_{a_i} \min_{\{g_i,j\}_{j=1}^{j_{max}}, \{b_i,k\}_{k=1}^{k_{max}}} D(c_i(\varepsilon), s_i(\varepsilon)).$$

According to some embodiments, $D(c_i(\varepsilon), s_i(\varepsilon)) = \int d\varepsilon |c_i(\varepsilon) - s_i(\varepsilon)|^2$ (or a discretized equivalent expression). According to some embodiments, a regularization term may be added to $D(c_i(\varepsilon), s_i(\varepsilon))$ to take into account prior knowledge regarding any of the free parameters and/or stabilize the solution (of the minimization algorithm).

According to some alternative embodiments, wherein there exists prior knowledge relating at least some of the free parameters to one another, the full set of optimized values, i.e., $$\left\{\hat{a}_i, \{\hat{g}_{i,j}\}_{j=1}^{j_{max}}, \{\hat{b}_{i,k}\}_{k=0}^{k_{max}}\right\}_{i=1}^{N_E}$$

(or equivalently $$\left\{\hat{a}_i, \hat{g}_i(\varepsilon), \hat{b}_i(\varepsilon)\right\}_{i=1}^{N_E},$$

wherein $\hat{g}_i(\varepsilon)$ and $\hat{b}_i(\varepsilon)$ denote the optimized functions defined by $$\left\{\hat{g}_{i,j}\right\}_{j=1}^{j_{max}} \text{ and } \left\{\hat{b}_{i,k}\right\}_{k=0}^{k_{max}},$$

respectively) is obtained by jointly optimizing over all of the adjustable parameters, i.e., $$\left\{a_i, \{g_{i,j}\}_{j=1}^{j_{max}}, \{b_i, k\}_{k=0}^{k_{max}}\right\}_{i=1}^{N_E}$$

subject to constraints imposed by the aforementioned prior knowledge. More specifically, in such embodiments, $$\{\hat{a}_i\}_{i=1}^{N_E} = \text{argmin}_{\{a_i\}_{i=1}^{N_E}} \min_{\left\{\{g_i,j\}_{j=1}^{j_{max}}, \{b_i,k\}_{k=0}^{k_{max}}\right\}_{i=1}^{N_E}} \sum_{i=1}^{N_E} D(c_i(\varepsilon), s_i(\varepsilon))$$

$$\text{s.t. } \{Q_l\}_{l=1}^{N_c},$$

wherein $$\{Q_l\}_{l=1}^{N_c}$$

is a set of $N_c$ constraints. (That is, each of the $Q_l$ is an equation, or inequality, relating at least some of the free parameters to one another.)

Figure 4D:
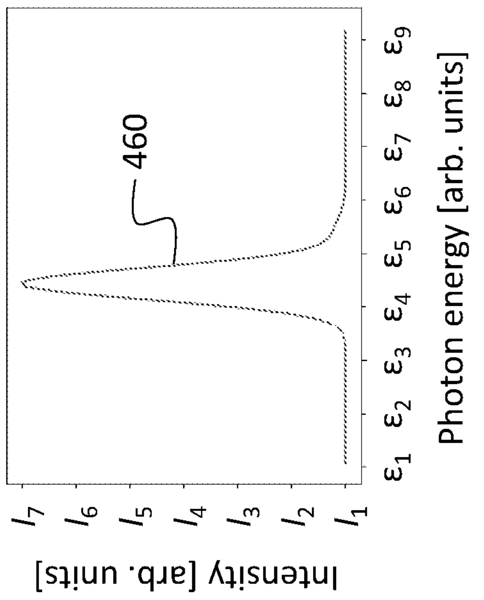
FIG. 4D presents a fitted gaussian included in the optimized curve of FIG. 4B, according to some embodiments.
Figure 4E:
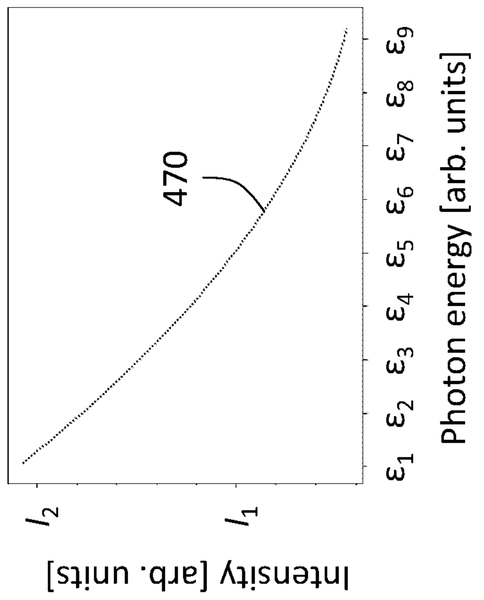
FIG. 4E presents a fitted polynomial included in the optimized curve of FIG. 4B, the fitted polynomial accounting for bremsstrahlung, according to some embodiments.
Figure 4C:
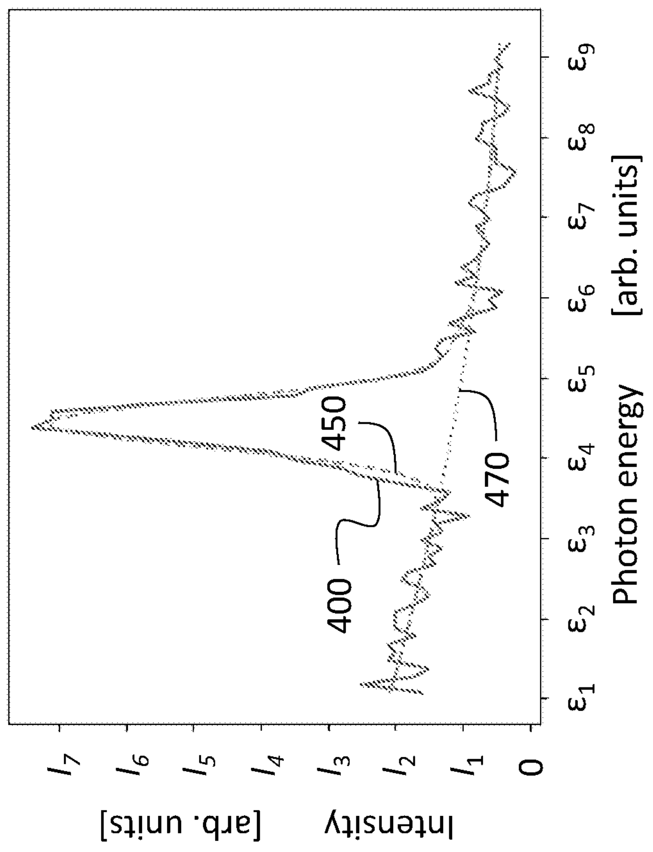
FIG. 4C presents the optimized curve of FIG. 4B superimposed on the X-ray emission spectrum of FIG. 4A.

As a non-limiting example, according to some embodiments depicted in FIGS. 4B-4E, the free curve is a sum of three adjustable functions. In addition to $g_i(\varepsilon)$ which is gaussian, and $b_i(\varepsilon)$, which is a second order polynomial, the sum additionally includes a gaussian $Y_i(\varepsilon)$. Referring to FIG. 4D, a curved line 460 corresponds to $\hat{a}_i \cdot \hat{g}_i(\varepsilon) + \hat{Y}_i(\varepsilon)$. $\hat{Y}_i(\varepsilon)$ (which is also gaussian) was obtained by optimizing over free parameters of $Y_i(\varepsilon)$. $\hat{g}_i(\varepsilon)$ is centered about the characteristic X-ray line of the target substance. $\hat{Y}_i(\varepsilon)$ is centered about a characteristic X-ray line of a (non-target) second substance present in the tested specimen. The characteristic line of the second substance is close to the characteristic line of the target substance and accordingly was taken into account in order to improve the accuracy of the determination of $\vec{f}_{key}$ (and consequently $\vec{p}_s$). Referring to FIG. 4E, a curved line 470 corresponds to $\vec{b}_i(\varepsilon)$. Curved line 470 is also plotted in FIG. 4C.

According to some embodiments, wherein the X-ray emission spectrum about a single characteristic X-ray line of a single target substance (included in the tested specimen) is used to determine $\vec{f}_{key}$, the number of components of $\vec{f}_{key}$ is equal to the number of e-beam landing energies. According to some embodiments, for each $$1 \le j \le J, f_{key}^{(j)}$$

is equal to $\hat{a}_j$—the j-th component of the energy signature. More generally, according to some embodiments, for each 1

$$\le j \le J, f_{key}^{(j)} = f_{key}\left(\hat{a}_j, \left\{\hat{b}_j, k\right\}_{k=0}^{k_{max}}\right), \text{ wherein } f_{key}\left(\hat{a}_j, \left\{\hat{b}_j, k\right\}_{k=0}^{k_{max}}\right)$$

is a function of $\hat{a}_j$ and $$\left\{\hat{b}_j, k\right\}_{k=0}^{k_{max}}.$$

That is, for each $1 \le j \le J$, the j-th component of the energy signature is a function of both $\hat{a}_j$ and the coefficients of $\hat{b}_i(\varepsilon)$. According to some such embodiments, $$f_{key}\left(\hat{a}_j, \left\{\hat{b}_j, k\right\}_{k=0}^{k_{max}}\right) = f_{key}\left(\hat{a}_j, q\left(\left\{\hat{b}_j, k\right\}_{k=0}^{k_{max}}\right)\right),$$

wherein q is a function of the coefficients of $\hat{b}_j(\varepsilon)$. As a non-limiting example, according to some embodiments, $$q\left(\left\{\hat{b}_j, k\right\}_{k=0}^{k_{max}}\right) = \langle \hat{b}_j(\varepsilon) \rangle$$

and $$f_{key}\left(\hat{a}_j, q\left(\left\{\hat{b}_j, k\right\}_{k=0}^{k_{max}}\right)\right) = \hat{a}_j / \langle \hat{b}_j(\varepsilon) \rangle,$$

wherein the triangular brackets denote averaging about the center of $\hat{g}_j(\varepsilon)$ along an interval equal to the width of $\hat{g}_j(\varepsilon)$.

According to some embodiments, the key features may be derived based on a dependence on the e-beam landing energy of the intensities of the emitted X-rays about each of a plurality of different characteristic X-ray lines. According to some such embodiments, wherein $N_L$ is the number of different characteristic X-ray lines, the key features are specified by a $J = N_E \times N_L$ component vector with components $$f_{key}^{(n_E, n_L)}$$

with $1 \le n_E \le N_E$ and $1 \le n_L \le N_L$ ($N_E$ is the number of landing energies). The first index denotes the e-beam landing energy and the second index denotes the characteristic X-ray line. That is, $$\vec{f}_{key} = \left(f_{key}^{(1,1)}, f_{key}^{(1,2)}, \ldots, f_{key}^{(1,N_L)}, f_{key}^{(2,1)}, f_{key}^{(2,2)}, \ldots, f_{key}^{(2,N_L)}, \ldots, f_{key}^{(N_E,1)}, f_{key}^{(N_E,2)}, \ldots, f_{key}^{(N_E,N_L)}\right).$$

In such embodiments, in measurement operation 110, for each e-beam landing energy, the X-ray emission spectrum is measured over a photon energy range or photon energy ranges including the plurality of characteristic X-ray lines. The components of $\vec{f}_{key}$ pertaining to a same characteristic X-ray line $$\left(\text{e.g., } f_{key}^{(1,2)}, f_{key}^{(2,2)}, \ldots, f_{key}^{(N_E,2)}\right)$$

may be obtained as described above in the case wherein $N_L=1$. According to some embodiments, wherein the at least one target substance includes $N_{sub}$ ($N_{sub} \le N_L$) target substances, the $N_L$ characteristic X-ray lines include characteristic X-ray lines corresponding to each of the $N_{sub}$ target substances, respectively.

As mentioned above, according to some embodiments, $$\vec{p}_s = \underset{\vec{p}}{\text{argmin}}\left(\min_{M_1,M_2} D\left(M_1\vec{f}_{key}, M_2\vec{f}_{ext}(\vec{p})\right)\right).$$

$M_1$ and $M_2$ are matrices having suitably selected properties (e.g., positive-definiteness and symmetries as specified below) and $D(M_1\vec{f}_{key}, M_2\vec{f}_{ext}(p))$ denotes a mathematical distance between $M_1\vec{f}_{key}$ and $M_2\vec{f}_{ext}(\vec{p})$. According to some embodiments, one or more regularizing terms may be added to $$\min_{M_1,M_2} D\left(M_1\vec{f}_{key}, M_2\vec{f}_{ext}(\vec{p})\right).$$

To render the description more concrete by way of a non-limiting example, addressed in detail are embodiments wherein the X-ray emission spectrum about a single characteristic X-ray line of a single target substance is used to determine $\vec{f}_{key}$, such that for each $$1 \le j \le N_E,\ f_{key}^{(j)}$$

is equal to $\hat{a}_j$ and $$f_{key}^{(N_E+j)} = \langle \hat{b}_j(\varepsilon) \rangle$$

(i.e., the number of components of $\vec{f}_{key}$ is equal to $2N_E$). That is, the first $N_E$ components of $\vec{f}_{key}$ are unnormalized energy signature components and the last $N_E$ components are pure bremsstrahlung (i.e., background radiation) components. According to some such embodiments, $$\vec{p}_s = \arg\min_{\vec{p}}\left(\min_M D\left(\vec{f}_{key}, M\vec{f}_{ext}(\vec{p})\right)\right)$$

(so that $M_1$ equals the identity matrix and $M_2=M$). Mis a diagonal matrix whose diagonal terms are pairwise equal in the sense that for each $1 \le j \le N_E$ $M_{N_E+j,\ N_E+j}=M_{j,\ j} \ge T$, wherein T is a the prespecified (positive) threshold. That is, for each $1 \le j \le N_E$, the $(N_E+j)$-th component along the diagonal of M equals the j-th component there along. Accordingly, for each $1 \le j \le N_E$, $\hat{a}_j$ and $\langle \vec{b}_j(\varepsilon) \rangle$ are weighted by the same respective factor. The inclusion of M, and the minimization thereover, may account for potentially different scaling of components $\vec{f}_{ext}(\vec{p})$ and corresponding components of $\vec{f}_{key}$, whereby, for at least some $$1 \le j \le N_E, \text{ a scale of } f_{ext}^{(j)}(\vec{p}) \text{ and } f_{ext}^{(N_E+j)}(\vec{p})$$

varies from that of $$f_{key}^{(j)} \text{ and } f_{key}^{(N_E+j)}.$$

According to some such embodiment, $$\vec{p}_s = \arg\min_{\vec{p}}\left(\min_M \left\|\vec{f}_{key} - M\vec{f}_{ext}(\vec{p})\right\|\right).$$

According to some embodiments, one or more regularizing terms may be added to $$\min_M \left\|\vec{f}_{key} - M\vec{f}_{ext}(\vec{p})\right\|.$$

More generally, according to some embodiments, $$\vec{p}_s = \arg\min_{\vec{p}}\left(F_0\left(\vec{f}_{key}, \vec{f}_{ext}(\vec{p})\right)\right),$$

wherein $F_0(\vec{f}_{key}, \vec{f}_{ext}(\vec{p}))$ is a loss function, which depends on $\vec{f}_{key}$ and $\vec{f}_{ext}(\vec{p})$ and is equal to $$\min_M \tilde{F}_0\left(\vec{f}_{key}, M\vec{f}_{ext}(\vec{p})\right)$$

(with M having the above specified properties and symmetries, i.e., pairwise equality). $\tilde{F}_0(\vec{f}_{key}, M\vec{f}_{ext}(\vec{p}))$ is a function (e.g., a loss function) depending on $\vec{f}_{key}$ and $M\vec{f}_{ext}(\vec{p})$. According to some embodiments, $$\vec{p}_s = \arg\min_{\vec{p}} \left( \min_{M} F_0\left(\vec{f}_{key}, M\vec{f}_{ext}(\vec{p})\right) + F_1(\vec{p}) \right),$$

wherein $F_1(\vec{p})$ is a regularizing function including one or more regularizing terms.

According to some embodiments, wherein a spectrometer is used to obtain the X-ray emission spectra, measurement data analysis operation 120 may include an initial preprocessing suboperation, wherein the X-ray emission spectra may be preprocessed to remove noise. According to some embodiments, a similar preprocessing suboperation may be included for the GT specimens, wherein the X-ray emission spectra are preprocessed to remove noise.

According to some embodiments of method 100, suboperation 120*a* includes an initial suboperation wherein difference spectra for the tested specimen are obtained by subtracting control spectra of a control specimen from the measured spectra of the tested specimen, which are obtained in measurement operation 110. The control spectra may be of a gold standard specimen, which is known, or assumed, to closely match the intended design of the tested specimen in the sense that one or more structural parameters (optionally, also structural parameters which are not estimated by method 100) of the gold standard specimen do not deviate by more than 1%, 2%, or 5% from the nominal values thereof. Each possibility corresponds to separate embodiments. In some embodiments, the control specimen is a GT specimen and the control data are GT data. In some embodiments, the control specimen and respective data are simulated. In some embodiments, the spectra of the control specimen include background radiation intensities similar to those measured for the tested specimen.

More specifically, the difference spectra may be processed (in suboperation 120*a*) to extract therefrom a vector of key features fair for the tested specimen, essentially as described above in the description of FIGS. 4A-4E with the difference that (due to the subtraction) any accounting for bremsstrahlung is obviated.

In such embodiments, the method further includes an operation in which difference spectra for the GT specimens are also obtained by subtracting control spectra of a control specimen from the measured spectra of the GT specimens by the same methods described herein for the tested specimen.

In some embodiments, the method further includes an operation in which difference spectra for the GT specimens are obtained by subtracting simulated spectra of a simulated specimen from the measured spectra of the GT specimens by the same methods described herein for the tested specimen.

In some embodiments, the method further includes an operation in which difference spectra for the simulated specimens are obtained by subtracting measured spectra of a GT specimen from the simulated spectra of the simulated specimens by the same methods described herein for the tested specimen.

In some embodiments, instead of obtaining difference spectra for the tested and reference (GT and/or simulated) specimens by subtracting spectra of a control (GT or simulated) specimen (as described above), certain key features of the tested and reference specimens are obtained by subtracting from the key features obtained by measurement (for the tested and the GT specimens) or by simulation (for the simulated specimens), corresponding key features obtained for a control (GT or simulated) specimen.

According to some embodiments, wherein a spectrometer is used to obtain the X-ray emission spectra, measurement data analysis operation 120 may include an initial preprocessing suboperation, wherein the X-ray emission spectra may be preprocessed to remove noise. According to some embodiments, a similar preprocessing suboperation may be included for the GT specimens, wherein the X-ray emission spectra are preprocessed to remove noise.

According to some embodiments of method 100, suboperation 120*a* includes an initial suboperation wherein difference spectra for the tested specimen are obtained by subtracting control spectra of a control specimen from the measured spectra of the tested specimen, which are obtained in measurement operation 110. The control spectra may be of a gold standard specimen, which is known, or assumed, to closely match the intended design of the tested specimen in the sense that one or more structural parameters (optionally, also structural parameters which are not estimated by method 100) of the gold standard specimen do not deviate by more than 1%, 2%, or 5% from the nominal values thereof. Each possibility corresponds to separate embodiments. In some embodiments, the control specimen is a GT specimen and the control data are GT data. In some embodiments, the control specimen and respective data are simulated. In some embodiments, the spectra of the control specimen include background radiation intensities similar to those measured for the tested specimen.

More specifically, the difference spectra may be processed (in suboperation 120*a*) to extract therefrom a vector of key features $\vec{f}_{dif}$ for the tested specimen, essentially as described above in the description of FIGS. 4A-4E with the difference that (due to the subtraction) any accounting for bremsstrahlung is obviated.

In such embodiments, the method further includes an operation in which difference spectra for the GT specimens are also obtained by subtracting control spectra of a control specimen from the measured spectra of the GT specimens by the same methods described herein for the tested specimen.

In some embodiments, the method further includes an operation in which difference spectra for the GT specimens are obtained by subtracting simulated spectra of a simulated specimen from the measured spectra of the GT specimens by the same methods described herein for the tested specimen.

In some embodiments, the method further includes an operation in which difference spectra for the simulated specimens are obtained by subtracting measured spectra of a GT specimen from the simulated spectra of the simulated specimens by the same methods described herein for the tested specimen.

In some embodiments, instead of obtaining difference spectra for the tested and reference (GT and/or simulated) specimens by subtracting spectra of a control (GT or simulated) specimen (as described above), certain key features of the tested and reference specimens are obtained by subtracting from the key features obtained by measurement (for the tested and the GT specimens) or by simulation (for the simulated specimens), corresponding key features obtained for a control (GT or simulated) specimen.

In such embodiments, the computer algorithm of suboperation 120*b* is configured to receive as an input $\vec{f}_{dif}$, and output $\vec{p}_s$, based on a set of $N_1$ vectors of GT key features $$\left\{\vec{f}'_n\right\}_{n=1}^{N1}$$

and $N_2$ vectors of simulated key features $$\{\vec{f}'_n\}_{n=N1+1}^{N}.$$

For each $$l \le n \le N_1, \vec{f}'_{n \le N1}$$

is obtained in the same way as $\vec{f}_{dif}$ for the tested specimen, including obtaining difference spectra by subtracting control spectra from the GT measured spectra and processing to extract the vector of key features $$\vec{f}'_{n \le N1}.$$

For each $$N_1 + 1 \le n \le N, \vec{f}'_{n>N1}$$

may be taken to equal $\vec{f}_{n>N1} - \vec{f}_0$. $\vec{f}_{n>N1}$ is obtained using the computer simulation when implemented with respect to the n-th simulated specimen (i.e., the simulated specimen characterized by $\vec{p}_n$, for $N_1+1 \le n \le N$). $\vec{f}_0$ is obtained using the control specimen when implemented with respect to the control specimen, which for the purposes of the computer simulation is assumed to be exactly characterized by $\vec{p}_0$. It is noted that in embodiments including extrapolation, the zeroth order term in $\vec{\delta} = \vec{p} - \vec{p}_0$ will be zero. Accordingly, when the extrapolation is onto a linear function, the extrapolated function will have the form $A\vec{\delta}$.

According to some such embodiments, method 100 may additionally include obtaining the control spectra, e.g., by implementing measurement operation 110 with respect to the control specimen.

It is to be understood that the applicability of method 100 is not limited to specimens including nominally flat layers (as depicted by way of a non-limiting example in FIGS. 2A-2D), and, more generally, layered specimens. Regions differing from one another in material composition may in principle be arbitrarily shaped. In particular, method 100 may be applied to structures including localized embedded (buried) features, such as nanowires, gate-all-around nanosheets, and, more generally, channels. Method 100 may also be applied to specimens characterized by continuously varying densities of substances included therein as function of the depth coordinate and/or, in the three-dimensional case, as a function of the lateral coordinates. Further, the skilled person will readily perceive that method 100 may be applied to specimens including empty cavities and/or holes.

Systems

According to an aspect of some embodiments, there is provided a computerized system for non-destructive three-dimensional probing and characterization of specimens (such as semiconductor structures, e.g., included in patterned wafers) based on X-ray measurements and subsequent analysis of the obtained measurement data using a computer simulation and measurements of GT specimens. FIG. 5 schematically depicts such a system, a computerized system 500, according to some embodiments. As will be apparent from the description of system 500, system 500 may be used to implement method 100 (including specific embodiments of method 100, which include measurement data analysis operation 300). In particular, system 500 may be used to estimate values of one or more structural parameters characterizing a tested specimen. Non-limiting examples of structural parameters, which may be estimated using system 500, are listed above in the Methods Subsection in the description of method 100.

System 500 includes an e-beam source 502, an X-ray detector 504 (or, more generally, an X-ray sensing assembly including two or more X-ray detectors), a processing circuitry 506, and a controller 508. According to some embodiments, system 500 may further include a stage 520 (e.g., a xyz stage) configured to accommodate a (tested) specimen 50. According to some embodiments, e-beam source 502, X-ray detector 504, and controller 508 form part of a scanning electron microscope. According to some embodiments, specimen 50 may be a patterned wafer or a structure (e.g., a semiconductor structure) included in or on a patterned wafer. According to some such embodiments, specimen 50 may be a preliminary structure in one of the fabrication stages of a patterned wafer or an assist structure employed in one of the fabrication stages of a patterned wafer. According to some embodiments, specimen 50 may be or include one or more memory components and/or logic components (such as a gate stack, for example, a high-k metal gate stack). It is noted that specimen 50 does not form part of system 500.

Dotted lines between elements indicate functional or communicational association there between.

E-beam source 502 is configured to produce e-beams at a plurality of e-beam landing energies. In particular, e-beam source 502 is configured to produce e-beams at each of a plurality of landing energies, so as to allow probing specimen 50 to a plurality of depths, respectively, essentially as described above in the description of suboperation 110*a* of method 100.

The greater the depth to which a tested specimen is to be probed, the greater the maximum e-beam landing energy, and, optionally, the number of e-beam landing energies. According to some embodiments, the plurality of e-beam landing energies may include landing energies up to about 5 keV, about 10 keV, about 15 keV, about 20 keV, or even about 30 keV. Each possibility corresponds to different embodiments. In silicon, an e-beam with a landing energy of about 15 keV may penetrate as deep as about 3 μm.

The durations of the projections of the e-beams may be dictated by the required precision to which $\vec{p}_s$ (i.e., the values of the one or more structural parameters characterizing specimen 50) is to be estimated.

An e-beam 505, generated by e-beam source 502, is shown incident on (an external surface 54 of) specimen 50, according to some embodiments. As a result of the impinging of e-beam 505 on specimen 50, and the penetration of e-beam 505 into specimen 50, X-rays, and, in particular, characteristic X-rays, are generated. A portion of these X-rays, constituted by X-rays 515, arrives at X-ray detector 504.

According to some embodiments, X-ray detector 504 is sensitive to electromagnetic radiation in the X-ray photon energy range (at least over the characteristic X-rays regime or one or more subranges thereof). According to some embodiments, X-ray detector 504 may be an EDX spectrometer or a WDX spectrometer. According to some embodiments, instead of a single X-ray detector, an X-ray detector assembly, which includes both an EDX spectrometer and a WDX spectrometer, may be used. In such embodiments the X-ray emission spectra may be obtained using both an EDX spectrometer and a WDX spectrometer with the WDX spectrometer being used to "zoom in" on the characteristic X-ray lines. In particular, the greater resolution of the WDX spectrometer (which renders it slower), as compared to the EDX spectrometer, allows obtaining narrower peaks and dips. According to some embodiments, wherein the spectrometer is a WDX spectrometer, X-ray detector 504 may be configured to allow scanning over extended photon energy ranges (thereby allowing to obtain X-ray emission spectra over extended photon energy ranges). X-ray detector 504 is configured to relay (optionally, via controller 508) the measurement data collected thereby (e.g., the spectrum of X-rays incident thereon) to processing circuitry 506.

According to some embodiments, system 500 may additionally include a window (not shown) positioned between X-ray detector 504 and stage 520, which may be configured to controllably and differentially attenuate the spectrum of the emitted X-rays and/or protect an X-ray sensitive surface of the spectrometer.

According to some alternative embodiments, X-ray detector 504 is configured to measure the intensity of electromagnetic X-ray radiation (i.e., electromagnetic radiation in the X-ray photon energy range) at or about a characteristic X-ray line of a (target) substance included in specimen 50 without additionally measuring the intensity of the electromagnetic X-ray radiation over an extended photon energy range outside the immediate vicinity of the characteristic X-ray line. According to some such embodiments, system 500 may additionally include an optical filter (not shown). The optical filter is configured to block electromagnetic radiation having a photon energy outside the immediate vicinity of the characteristic X-ray line from reaching X-ray detector 504.

According to some embodiments, system 500 may include additional elements. The additional elements may include electron optics (not shown; e.g., an electrostatic lens(es) and a magnetic deflector(s)), which may be used to guide and manipulate an e-beam generated by e-beam source 502. Additionally, or alternatively, the additional elements may include collection optics configured to guide onto X-ray detector 504 electromagnetic radiation generated due to the impinging of an e-beam on specimen 50 and penetration of the e-beam thereinto. According to some embodiments, the additional elements may include a filter configured to block electromagnetic radiation outside characteristic X-rays regime and/or one or more subranges thereof.

According to some embodiments, at least e-beam source 502 and stage 520 may be housed within a vacuum chamber 530. While in FIG. 5 X-ray detector 504 is shown positioned inside vacuum chamber 530, according to some alternative embodiments, X-ray detector 504 may be positioned outside vacuum chamber 530.

Controller 508 may be functionally associated with e-beam source 502 and, optionally, stage 520. More specifically, controller 508 is configured to control and synchronize operations and functions of the above-listed instrumentation and components during probing of a tested specimen (e.g., instruct the e-beam source to change the e-beam landing energy).

Processing circuitry 506 may include one or more processors and, optionally, RAM and/or non-volatile memory components (not shown). The one or more processors are configured to execute software instructions stored e.g., in the non-volatile memory components. Through the execution of the software instructions, measurement data (e.g., obtained by X-ray detector 504) of a tested specimen (e.g., specimen 50) is processed to estimate $\vec{p}_s$, essentially as described above in the description of FIGS. 1 and 3.

More specifically, processing circuitry 506 is configured to process the measurement data to estimate the values (denoted by p's) of the one or more structural parameters characterizing the tested specimen, as detailed above in the Methods Subsection. To this end, processing circuitry 506 is configured to extract from the measurement data a vector $\vec{f}_{key}$ specifying values of key features obtained with respect to the tested specimen, as detailed above in the description of suboperation 120*b* of method 100. In particular, according to some embodiments, the key features include (e.g., are constituted by) the so-called "energy signature". According to some embodiments, each component of the energy signature may correspond to an absolute, normalized, or relative intensity of a respective characteristic X-ray line.

According to some embodiments, wherein the measurement data are X-ray emission spectra, processing circuitry 506 may be configured to fit onto each of the X-ray emission spectra a respective (free) curve, thereby obtaining an optimized curve. From the optimized curve $\vec{f}_{key}$ may next be extracted, as described above in the description of suboperation 120*a* of method 100. According to some such embodiments, processing circuitry 506 may be configured to execute one or more optimization algorithms (e.g., to solve the optimization problems specified above in the description of FIGS. 4A-4E). Examples of relevant optimization algorithms include standard iterative optimization algorithms, such as gradient descent or Newton's method. According to some embodiments, customized iterative optimization algorithms—obtained by "tweaking" standard iterative optimization algorithms to account for constraints and/or to assure that a global minimum is attained—may be employed.

More specifically, in order to estimate $\vec{p}_s$, processing circuitry 506 is configured to additionally take into account a set of vectors including GT key features $$\{\vec{f}_n\}_{n=1}^{N1}$$

and simulated key features $$\{\vec{f}_n\}_{n=N1+1}^{N},$$

as defined above for the method aspect. For each $1 \le n \le N_1$, $\vec{p}_n$ specifies values of the one or more structural parameters characterizing an n-th GT specimens, and for each $N_1+1 \le n \le N$, $\vec{p}_n$ specifies values of the one or more structural parameters characterizing an n-th simulated specimens. For GT specimens, each of the $\vec{f}_{n \le N1}$ may be obtained by actual measurements in the same way as $\vec{f}_{key}$ is obtained for the tested specimen. For the simulated specimens, each of the $\vec{f}_{n>N1}$ may be obtained through computer simulation of emission of X-rays from the respective simulated specimen, due to impinging thereon, one at a time, with e-beams at each of the one or more landing energies, as described above in the Methods Subsection. According to some embodiments, and as expanded on above in the description of method 100, the $\vec{p}_n$ sample a selected hypervolume centered about $\vec{p}_0$ in a $K_P$ dimensional vector space defined by the one or more structural parameters with $K_P$ being the number of the one or more structural parameters.

According to some embodiments, processing circuitry 506 may further be configured to obtain $$\{\vec{f}_n\},$$

i.e., by simulating the striking of one or more e-beams (one at a time) on each of the $N_2$ simulated specimens, the penetration of the one or more e-beams thereinto, and the resulting emission of X-rays.

According to some embodiments, processing circuitry 506 may be configured to compute $$\vec{p}_s = \langle \vec{p}_i \rangle_{i=1}^{k},$$

wherein the k $\vec{p}_i$ (k<N) label the k $\vec{f}_n$, which are closest to $\vec{f}_{key}$ and the triangular brackets denote averaging, optionally, weighted, over the k $\vec{p}_i$. To this end, according to some embodiments, processing circuitry 506 may be configured to apply a k-nearest neighbor (k–NN) regression algorithm to $\vec{f}_{key}$ with respect to $$\{\vec{f}_n\}_{n=1}^{N}.$$

According to some embodiments, processing circuitry 506 may be configured to obtain $\vec{p}_s$ by computing the median of the $\vec{p}_n$ corresponding to the k closest $\vec{f}_n$. As explained above for the method aspect, the k–NN or the median may assign weights so as to be biased towards GT data points.

According to some alternative embodiments, $\vec{p}_s$ minimizes a loss function, which is a function of at least $\vec{f}_{key}$ and a vector-valued function $\vec{f}_{ext}(\vec{p})$ of the key features that is extrapolated from $$\{\vec{f}_n\}_{n=1}^{N}.$$

(Optionally, in addition to a first term dependent on $\vec{f}_{key}$ and $\vec{f}_{ext}(\vec{p})$, the loss function may additionally include one or more regularizing terms.) Accordingly, processing circuitry 506 may be configured to (i) execute an optimization algorithm to minimize over $\vec{p}$ the loss function (e.g., minimize the distance between $\vec{f}_{key}$ and $\vec{f}_{ext}(\vec{p})$), and (ii) in embodiments wherein the minimization over the loss function has a known analytical solution, additionally, or alternatively, estimate $\vec{p}_s$ directly from the (function defining the) analytical solution. According to some such embodiments, processing circuitry 506 may be configured to estimate $\vec{p}_s$ by (numerically or analytically) solving the optimization problem $$\arg\min_{\vec{p}} \left\| \vec{f}_{key} - \vec{f}_{ext}(\vec{p}) \right\|,$$

or, more generally, $$\arg\min_{\vec{p}} \left( \min_{M} \left\| \vec{f}_{key} - M\vec{f}_{ext}(\vec{p}) \right\| \right),$$

wherein M is a positive definite matrix (e.g., a diagonal positive definite matrix with pairwise equal diagonal terms as specified above) whose minimum eigenvalue is greater than a prespecified (positive) threshold, and, even more generally, $$\arg\min_{\vec{p}} \left( \min_{M_1, M_2} D\left( M_1\vec{f}_{key}, M_2\vec{f}_{ext}(\vec{p}) \right) \right),$$

wherein $M_1$ and $M_2$ are suitably selected matrices and $D(M_1\vec{f}_{key}, M_2\vec{f}_{ext}(\vec{p}))$ is a mathematical distance between $M_1\vec{f}_{key}$ and $M_2\vec{f}_{ext}(\vec{p})$. $\vec{f}_{ext}(\vec{p})$ is the vector-valued function of the key features (extrapolated from $$\{\vec{f}_n\}_{n=1}^{N})$$

and models the dependence of the key features on the on the values of the one or more structural parameters. As explained above for the method aspect, the vector-valued function $\vec{f}_{ext}(\vec{p})$, the optimization, and/or the loss function may comprise different treatment for different data points, or for different groups of data points, such as data points derived from GT measurements and data points derived from computer simulations. In some embodiments, the treatment results in a bias towards GT data points, such that the result is more affected by the GT data points.

According to some embodiments, processing circuitry 506 may be further configured to perform the extrapolation (and thereby obtain $\vec{f}_{ext}(\vec{p})$). According to some such embodiments, the extrapolation may be to a linear function, i.e., $\vec{f}_{ext}(\vec{p})=\vec{f}_{ext}(\vec{p}_0+\vec{\delta})=\vec{f}_0+A\vec{\delta}=\vec{f}_0+A(\vec{p}-\vec{p}_0)$. $\vec{\delta}$ denotes deviations from nominal values $\vec{p}_0$ of the one or more structural parameters. $\vec{f}_0$ is a vector of values of the key features corresponding to $\vec{p}_0$. A is a matrix determinable through optimization, which takes into account the $$\{\vec{f}_n\}_{n=1}^{N},$$

as detailed above in the description of method 300. As explained above for the method aspect, the extrapolation may comprise different treatment for different data points, or for different groups of data points, such as data points derived from GT measurements and data points derived from computer simulations. In some embodiments, the treatment results in a bias towards GT data points, such that the result is more affected by the GT data points.

According to some embodiments, processing circuitry 506 may be configured to select the $$\{\vec{f}_n\}_{n=1}^{N}$$

from a larger set $$\{\vec{f}_i\}_{i=1}^{N'}(N' > N)$$

by subjecting $\vec{f}_{key}$ to an (k=N)–NN classifier with respect to $$\{\vec{f}_i\}_{i=1}^{N'}.$$

In some embodiments, as described above for the method aspect, the larger set may include additional GT specimens and/or additional simulated specimens. In some embodiments, as described above for the method aspect, processing circuitry 506 may be configured to select the $$\{\vec{f}_n\}_{n=N1+1}^{N}$$

from a larger set of simulated data $$\{\vec{f}_i\}_{i=1}^{N2'}(N_2' > N_2)$$

by subjecting $\vec{f}_{key}$ to an (k=$N_2$)–NN classifier with respect to $$\{\vec{f}_i\}_{i=1}^{N2'}.$$

s used herein, the terms "fitted" and "optimized" are interchangeable when employed in the context of curve fitting.

According to some embodiments, processing circuitry 506 and controller 508 may be housed in a common housing, for example, when implemented by a single computer.

In the description and claims of the application, the words "include" and "have", and forms thereof, are not limited to members in a list with which the words may be associated.

As used herein, the term "about" may be used to specify a value of a quantity or parameter (e.g., the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

According to some embodiments, an estimated quantity or estimated parameter may be said to be "about optimized" or "about optimal" when falling within 5%, 10% or even 20% of the optimal value thereof. Each possibility corresponds to separate embodiments. In particular, the expressions "about optimized" and "about optimal" also cover the case wherein the estimated quantity or estimated parameter is equal to the optimal value of the quantity or the parameter. The optimal value may in principle be obtainable using mathematical optimization software. Thus, for example, an estimated (e.g., an estimated residual) may be said to be "about minimized" or "about minimal/minimum", when the value thereof is no greater than 101%, 105%, 110%, or 120% (or some other pre-defined threshold percentage) of the optimal value of the quantity. Each possibility corresponds to separate embodiments.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

In flowcharts, optional operations, and suboperations, are delineated by a dashed line. Similarly, in block diagrams, optional elements may be delineated by a dashed line. Further, (in block diagrams) dotted lines connecting elements may be used to represent functional association or at least one-way or two-way communicational association between the connected elements.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods, according to some embodiments, may be described in a specific sequence, the methods of the disclosure may include some or all of the described operations carried out in a different order. In particular, it is to be understood that the order of operations and suboperations of any of the described methods may be reordered unless the context clearly dictates otherwise, for example, when a latter operation requires as input the output of earlier operation or when a latter operation requires the product of an earlier operation. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims.

It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purposes and should not be regarded as limiting. Citation or identification of any reference in this application shall not be construed as an admission that such reference is available as prior art to the disclosure. Section headings are used herein to ease understanding of the specification and should not be construed as necessarily limiting.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g., electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, flash memories, solid state drives (SSDs), or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

What is claimed is:

1. A system for non-destructive characterization of specimens, the system comprising:

an electron beam (e-beam) source for projecting e-beams at one or more e-beam landing energies on a specimen being tested;

an X-ray detector for sensing X-rays emitted from the tested specimen; and processing circuitry configured to:

receive from the X-ray detector X-ray measurement data pertaining to one or more e-beam landing energies;

extract from the X-ray measurement data a vector $\vec{f}_{key}$ specifying values of key features of the X-ray measurement data; and estimate values $\vec{p}_s$ of one or more structural parameters of the tested specimen, based on $\vec{f}_{key}$ and a set of vectors $$\{\vec{f}_n\}_{n=1}^{N}$$

comprising $N_1$ vectors of ground truth (GT) key features and $N_2$ vectors of simulated key features corresponding to respective GT and simulated reference specimens, wherein $N_1$ is a positive integer number of the GT specimens, $N_2$ is a positive integer number of the simulated reference specimens, $N_1+N_2=N$, n is an index identifying one of the GT and simulated reference specimens, and for each $1 \le n \le N$, $\vec{p}_n$ specifies values of one or more structural parameters of an n-th specimen, and $\vec{f}_n$ is obtained for $1 \le n \le N_1$ (GT specimens) through actual measurements and for $N_1+1 \le n \le N$ (simulated specimens) by computer simulation, of emission of X-rays from the n-th reference specimen due to impinging thereof with e-beams at each of the one or more landing energies.

2. The system of claim 1, wherein $\vec{p}_s$ minimizes a loss function, which is a function of at least $\vec{f}_{key}$ and a vector-valued function $\vec{f}_{ext}(\vec{p})$ of the key features, which is extrapolated from $$\{\vec{f}_n\}_{n=1}^{N}.$$

3. The system of claim 1, wherein the processing circuitry is further configured to estimate $\vec{p}_s$ by computing distances between $\vec{f}_{key}$ and the $\vec{f}_n$.

4. The system of claim 1, wherein the GT specimens include specimens of a same, or a similar, intended design as the tested specimen; and/or the GT specimens include especially prepared samples exhibiting selected variations with respect to the intended design; and/or the simulated specimens are selected so as to encompass expected variations of the one or more structural parameters.

5. The system of claim 1, wherein the one or more structural parameters comprise one or more of:

(i) an overall concentration of at least one material that the tested specimen comprises; and (ii) a width of a structure embedded in the tested specimen.

6. The system of claim 1, wherein the tested specimen comprises a plurality of layers, and the one or more structural parameters comprise one or more of (i) at least one thickness of at least one of the layers; (ii) a combined thickness of at least two or more of the layers; (iii) at least one mass density of at least one of the layers; and (vi) at least one relative concentration of at least one material in one or more of the layers.

7. The system of claim 6, wherein the one or more e-beam landing energies induce emission of X-rays originating from at least two of the plurality of layers.

8. The system of claim 1, wherein the one or more e-beam landing energies induce emission of X-rays about one or more characteristic X-ray lines pertaining to one or more target substances which the tested specimen comprises; wherein the X-ray detector is configured to sense at least one measured spectrum of the emitted X-rays in at least one photon energy range, which comprises at least one of the characteristic X-ray lines; and wherein the X-ray measurement data comprises the measured spectra.

9. The system of claim 8, wherein the key features are, comprise, or are functions of intensities of the characteristic X-ray lines and/or intensities of background radiation.

10. The system of claim 1, wherein the processing circuitry is further configured to estimate the values $\vec{p}_s$ of the one or more structural parameters of the tested specimen by treating the $N_1$ vectors of GT key features differently from the $N_2$ vectors of simulated key features, such that the estimate is more affected by GT data than by simulated data.

11. The system of claim 2, wherein $$\vec{p}_s = \underset{\vec{p}}{\arg\min} \left\| \vec{f}_{key} - \vec{f}_{ext}(\vec{p}) \right\|$$

with the double vertical bars denoting a vector norm.

12. The system of claim 2, wherein $\vec{f}_{ext}(\vec{p})=\vec{f}_{ext}(\vec{p}_0+\vec{\delta})=\vec{f}_0+A\vec{\delta}$ with $\vec{p}_0$ specifying nominal values of the one or more structural parameters, $\vec{\delta}$ specifying deviations from the nominal values, $\vec{f}_0$ being a vector of values of the key features corresponding to $\vec{p}_0$, and A being a matrix.

13. The system of claim 12, wherein the matrix A equals $$\underset{B}{\arg\min} \left\| \begin{pmatrix} (\vec{f}_1 - \vec{f}_0 - B\vec{\delta}_1)^T \\ (\vec{f}_2 - \vec{f}_0 - B\vec{\delta}_2)^T \\ \vdots \\ (\vec{f}_N - \vec{f}_0 - B\vec{\delta}_N)^T \end{pmatrix} \right\|;$$

or $\vec{f}_0$ and the matrix A are obtained as the solution of $$\underset{\vec{g},\,B}{\arg\min} \left\| \begin{pmatrix} (\vec{f}_1 - \vec{g} - B\vec{\delta}_1)^T \\ (\vec{f}_2 - \vec{g} - B\vec{\delta}_2)^T \\ \vdots \\ (\vec{f}_N - \vec{g} - B\vec{\delta}_N)^T \end{pmatrix} \right\|,$$

and wherein the double vertical bars denote a matrix norm;

wherein B is an optimization variable representing a candidate matrix having the same dimensions as matrix A;

wherein superscript T denotes a transpose;

wherein $\vec{g}$ is an optimization variable representing a candidate vector of values of the key features corresponding to the nominal values;

and for each $1 \le n \le N$, $\vec{\delta}_n = \vec{p}_n - \vec{p}_0$.

14. The system of claim 12, wherein the matrix A equals $$\underset{B}{\arg\min} \sum_{i=1}^{N} \alpha_i \left\| \vec{f}_i - \vec{f}_0 - B\vec{\delta}_i \right\|^2;$$

or $\vec{f}_0$ and the matrix A are obtained as the solution of $$\underset{\vec{g},\,B}{\arg\min} \sum_{i=1}^{N} \alpha_i \left\| \vec{f}_i - \vec{g} - B\vec{\delta}_i \right\|^2,$$

and wherein the double vertical bars denote a vector norm; for each $1 \le n \le N$, $\vec{\delta}_n = \vec{p}_n - \vec{p}_0$; wherein, for each i satisfying $1 \le i \le N$, $\alpha_i$ is a weight assigned to an i-th one of the vectors of key features, and values of ai assigned to the GT key-feature vectors differ from values of ai assigned to the simulated key-feature vectors.

15. The system of claim 3, wherein the processing circuitry is further configured to, as part of estimating $\vec{p}_s$, apply a k-nearest neighbor (k-NN) regression algorithm to $\vec{f}_{key}$ with respect to $$\{\vec{f}_n\}_{n=1}^{N}$$

in order to determine k vectors of the $\vec{f}_n$, which are closest to $\vec{f}_{key}$ wherein k is a positive integer less than N.

16. The system of claim 2, wherein the processing circuitry is further configured to obtain $$\{\vec{f}_n\}_{n=1}^{N}$$

by subjecting $\vec{f}_{key}$ to an (k=N)–NN classifier with respect to a set of $$\{\vec{f}_{n'}\}_{n'=1}^{N'}$$

vectors of key features, wherein N'>N and $\vec{f}_n$, comprises $\vec{f}_n$, and the additional N'−N vectors are obtained by actual measurements of additional GT specimens and/or by applying the computer simulations with respect to additional simulated specimens, wherein k is a number of nearest neighbors used by the classifier and equals N, and wherein N' is a positive integer greater than N.

17. The system of claim 9, wherein, in order to derive intensities of the characteristic X-ray lines, the processing circuitry is configured to fit a free curve onto each interval of the measured spectra, which is about centered about a respective characteristic X-ray line and constituted by a vicinity of the characteristic X-ray line, thereby obtaining a respective optimized curve.

18. The system of claim 17, wherein the free curve is a sum of functions comprising a Gaussian function and a polynomial function, and the processing circuitry is configured to, as part of the fitting of the free curve, fit the Gaussian function onto a peak about the characteristic X-ray line of the respective measured spectrum, and fit the polynomial function so as to account for a background intensity component of the respective measured spectrum.

19. The system of claim 1, wherein the tested specimen is a patterned wafer, or a part of a patterned wafer, in one of the fabrication stages thereof.

20. A method for non-destructive characterization of specimens, the method comprising:

a measurement operation comprising, for each of one or more landing energies, suboperations of: projecting an e-beam on a tested specimen, and obtaining measurement data by measuring intensity of X-rays emitted from the tested specimen due to penetration of the e-beam thereinto; and a measurement data analysis operation comprising sub-operations of:

extracting from the measurement data a vector $\vec{f}_{key}$ specifying values of key features; and estimating values $\vec{p}_s$ of one or more structural parameters of the tested specimen based on $\vec{f}_{key}$ and a set of vectors $$\{\vec{f}_n\}_{n=1}^{N}$$

comprising $N_1$ vectors of ground truth (GT) key features and $N_2$ vectors of simulated key features corresponding to respective GT and simulated specimens, wherein $N_1$ is a positive integer number of the GT specimens, $N_2$ is a positive integer number of the simulated specimens, $N_1+N_2=N$, n is an index identifying one of the GT and simulated specimens, and for each $1\leq n\leq N$, $\vec{p}_n$ specifies values of one or more structural parameters of an n-th specimen, and $\vec{f}_n$ is obtained for $1\leq n\leq N_1$ (GT specimens) through measurements and for $N_1+1\leq n\leq N$ (simulated specimens) by computer simulation, of emission of X-rays from the n-th specimen due to impinging thereof with e-beams at each of the one or more landing energies.

* * * * *